US012047742B2

(12) United States Patent
Lee et al.

(10) Patent No.: US 12,047,742 B2
(45) Date of Patent: Jul. 23, 2024

(54) VIBRATION GENERATING DEVICE AND DISPLAY APPARATUS INCLUDING THE SAME

(71) Applicant: LG Display Co., Ltd., Seoul (KR)

(72) Inventors: YongWoo Lee, Paju-si (KR); Chiwan Kim, Paju-si (KR); Taeheon Kim, Paju-si (KR); Sung-Eui Shin, Paju-si (KR); Kyungyeol Ryu, Paju-si (KR); YuSeon Kho, Paju-si (KR); YongGyoon Jang, Paju-si (KR); Yong-Su Ham, Paju-si (KR); Sungwook Ko, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/213,648

(22) Filed: Jun. 23, 2023

(65) Prior Publication Data

US 2023/0336922 A1 Oct. 19, 2023

Related U.S. Application Data

(63) Continuation of application No. 17/871,842, filed on Jul. 22, 2022, now Pat. No. 11,722,825, which is a (Continued)

(30) Foreign Application Priority Data

Dec. 31, 2018 (KR) ........................ 10-2018-0174267
Dec. 4, 2019 (KR) ........................ 10-2019-0159972

(51) Int. Cl.
*H04R 17/00* (2006.01)
*G08B 6/00* (2006.01)
(Continued)

(52) U.S. Cl.
CPC ............... *H04R 17/00* (2013.01); *G08B 6/00* (2013.01); *H04R 1/028* (2013.01); *H04R 1/288* (2013.01);
(Continued)

(58) Field of Classification Search
CPC ........ H04R 17/00; H04R 1/028; H04R 1/288; H04R 1/403; H04R 3/12; H04R 2499/15; G08B 6/00
See application file for complete search history.

(56) References Cited

U.S. PATENT DOCUMENTS 9,607,203 B1 3/2017 Yazdandoost
2003/0202672 A1 10/2003 Yamauchi et al.
(Continued)

FOREIGN PATENT DOCUMENTS

JP 2000-028595 A 1/2000
JP 2004-328055 A 11/2004
(Continued)

OTHER PUBLICATIONS

Office Action issued in corresponding Chinese Patent Application No. 201911365074.4, dated Jan. 5, 2023.
(Continued)

*Primary Examiner* — Mark Fischer
(74) *Attorney, Agent, or Firm* — Morgan, Lewis & Bockius LLP

(57) ABSTRACT

A display apparatus includes a display panel configured to display an image and a plurality of vibration generating devices on a rear surface of the display panel, the display panel being at least one of a vibration plate configured to output sound and a vibration plate configured to output a haptic vibration. Each of the plurality of vibration generating devices includes a first electrode under the display panel, a piezoelectric member under the first electrode, a damping
(Continued)

II-II'

530(531,532,533)
250(251,252,253)

member in a periphery the piezoelectric member, and a second electrode under the piezoelectric member.

22 Claims, 14 Drawing Sheets

Related U.S. Application Data continuation of application No. 17/169,056, filed on Feb. 5, 2021, now Pat. No. 11,412,331, which is a continuation of application No. 16/722,713, filed on Dec. 20, 2019, now Pat. No. 10,951,992.

(51) Int. Cl.

*H04R 1/02* (2006.01)
*H04R 1/28* (2006.01)
*H04R 1/40* (2006.01)
*H04R 3/12* (2006.01)

(52) U.S. Cl.

CPC ............... *H04R 1/403* (2013.01); *H04R 3/12* (2013.01); *H04R 2499/15* (2013.01)

(56) References Cited

U.S. PATENT DOCUMENTS

| | | | | |
|---|---|---|---|---|
| 2004/0205949 | A1 | 10/2004 | Takeshima et al. | |
| 2007/0063616 | A1 | 3/2007 | Adachi et al. | |
| 2013/0077443 | A1* | 3/2013 | Onishi | H04R 17/00 310/322 |
| 2014/0098978 | A1 | 4/2014 | Fukuoka et al. | |
| 2016/0020380 | A1* | 1/2016 | Miyoshi | C08L 101/00 252/62.9 PZ |
| 2016/0040744 | A1 | 2/2016 | Sumita et al. | |
| 2017/0060244 | A1 | 3/2017 | Khoshkava et al. | |
| 2017/0153531 | A1 | 6/2017 | Kubota et al. | |
| 2017/0280234 | A1* | 9/2017 | Choi | H04R 1/025 |
| 2018/0198052 | A1 | 7/2018 | Park et al. | |
| 2018/0229271 | A1* | 8/2018 | Inoue | H04R 5/02 |
| 2018/0288202 | A1 | 10/2018 | Park et al. | |
| 2018/0317000 | A1 | 11/2018 | Ham et al. | |
| 2018/0324519 | A1 | 11/2018 | Park et al. | |
| 2019/0050024 | A1* | 2/2019 | Ahn | H04R 9/06 |
| 2019/0378382 | A1 | 12/2019 | Khoshkava et al. | |
| 2020/0211337 | A1 | 7/2020 | Grant et al. | |

FOREIGN PATENT DOCUMENTS

| | | | |
|---|---|---|---|
| KR | 10-2013-0019114 | A | 2/2013 |
| KR | 10-2017-0076549 | A | 7/2017 |
| KR | 10-2018-0062320 | A | 6/2018 |
| KR | 10-2018-0121293 | A | 11/2018 |

OTHER PUBLICATIONS

English machine translation of JP 2000-028595 (Wakabayashi et al., Manufacture of Piezoelectric Structure and Combined Piezoelectric Vibrator, published Jan. 2000) (Year: 2000).

Office Action issued in corresponding Korean Patent Application No. 10-2019-0159972, dated May 9, 2024. (Note: US 2016/0020380 A1, US 2016/0040744 A1 and US 2013/0077443 A1 were previously cited).

* cited by examiner

VIBRATION GENERATING DEVICE AND DISPLAY APPARATUS INCLUDING THE SAME

CROSS-REFERENCE TO RELATED APPLICATIONS

This application is a continuation of U.S. patent application Ser. No. 17/871,842 filed on Jul. 22, 2022, which is a continuation of U.S. patent application Ser. No. 17/169,056 filed on Feb. 5, 2021, which is a continuation of U.S. patent application Ser. No. 16/722,713, filed on Dec. 20, 2019, now U.S. Pat. No. 10,951,992, which claims the benefit of the Korean Patent Application No. 10-2018-0174267 filed on Dec. 31, 2018 and 10-2019-0159972 filed on Dec. 4, 2019, all of which are hereby incorporated by reference as if fully set forth herein.

BACKGROUND

Technical Field

The present disclosure relates to a vibration generating device for outputting a sound and a haptic feedback and a display apparatus including the vibration generating device.

Discussion of the Related Art

Display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

Display apparatuses may include a display panel for displaying an image and a sound device for outputting a sound associated with the image. However, in display apparatuses, because a sound output from a sound device may travel to a rearward or a downward direction of the display apparatus, the sound quality may be degraded due to interference between sounds reflected from a wall and the ground. For this reason, it may be difficult to transfer an accurate sound, and the immersion of a viewer is reduced.

Moreover, when display apparatuses need haptic feedback performance, a haptic actuator should be separately provided.

SUMMARY

Accordingly, embodiments of the present disclosure are directed to a vibration generating device and a display apparatus including the same that substantially obviates one or more of the problems due to limitations and disadvantages of the related art.

Therefore, the inventors have performed various experiments for implementing a display apparatus which realizes a stereo sound and performs a haptic output on the basis of a position of a display panel. Through the various experiments, the inventors have invented a display apparatus having a new structure, which includes a vibration generating device for outputting a sound and a haptic vibration.

Accordingly, an aspect of the present disclosure is to provide a vibration generating device and a display apparatus that substantially obviate one or more problems due to limitations and disadvantages of the related art.

Another aspect of the present disclosure is to provide a display apparatus which realizes a stereo sound and performs a haptic output differentiated based on a position of a display panel.

Another aspect of the present disclosure is to provide a display apparatus which improves sound quality, increases an immersion experience of a viewer, and performs a haptic output based on a position of a display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display apparatus comprises a display panel configured to display an image and a plurality of vibration generating devices on a rear surface of the display panel, the display panel being at least one of a vibration plate configured to output sound and a vibration plate configured to output a haptic vibration, each of the plurality of vibration generating devices includes a first electrode under the display panel, a piezoelectric member under the first electrode, a damping member in a periphery of the piezoelectric member, and a second electrode under the piezoelectric member.

In another aspect, a vibration generating device comprises a piezoelectric member under a first electrode, a damping member configured to surround at least a portion of the piezoelectric member, and a second electrode under the piezoelectric member.

In another aspect, a display apparatus comprises a display panel configured to display an image and a plurality of vibration generating devices on a rear surface of the display panel, the plurality of vibration generating devices configured to vibrate the display panel to generate a vibration, each of the plurality of vibration generating devices includes a first electrode under the display panel, a plurality of piezoelectric members under the first electrode, the plurality of piezoelectric members having different vibration characteristics, and a second electrode under the plurality of piezoelectric members.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are exemplary and explanatory, and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure.

DETAILED DESCRIPTION

Figure 1:
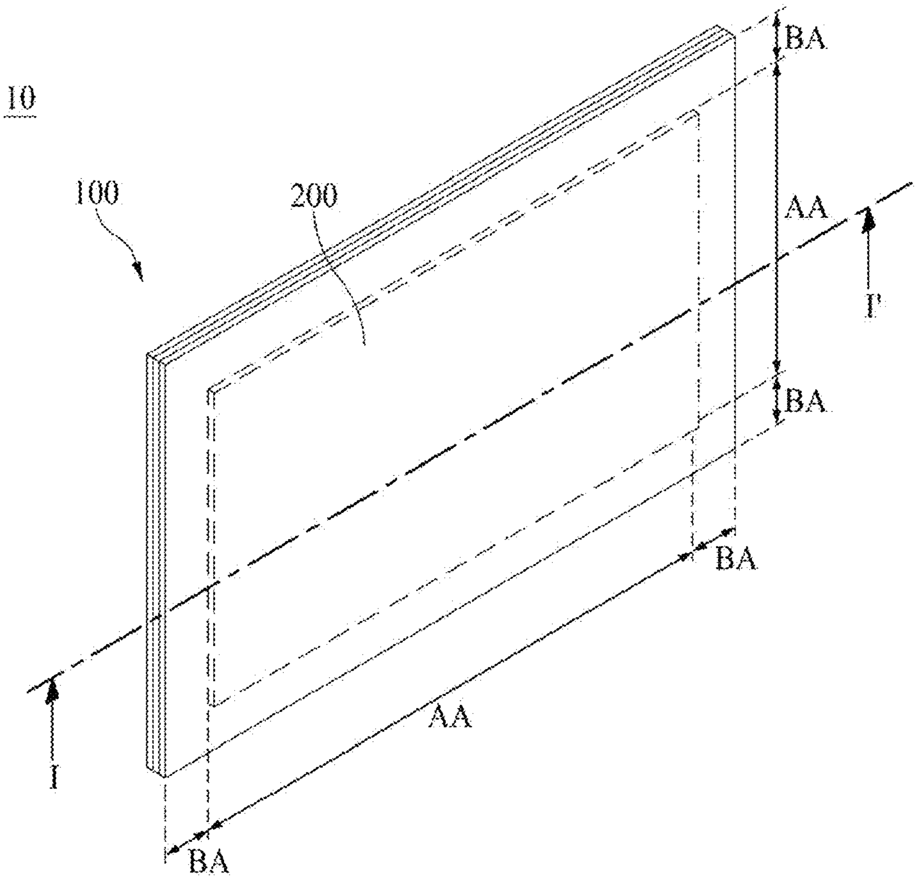
FIG. 1 illustrates a display apparatus according to an embodiment of the present disclosure.

Reference will now be made in detail to the exemplary embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where “comprise”, “have”, and “include” described in the present specification are used, another part may be added unless “only” is used. The terms of a singular form may include plural forms unless referred to the contrary.

In construing an element, the element is construed as including an error range although there is no explicit description.

In describing a position relationship, for example, when a position relation between two parts is described as “on,” “over,” “under,” and “next,” one or more other parts may be disposed between the two parts unless “just(ly)” or “direct(ly)” is used.

In describing a time relationship, for example, when the temporal order is described as “after,” “subsequent,” “next,” and “before,” a case which is not continuous may be included unless “just(ly)” or “direct(ly)” is used.

It will be understood that, although the terms “first”, “second”, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being “on” or “connected to” another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term “at least one” should be understood as including any and all combinations of one or more of the associated listed elements. For example, the meaning of “at least one of a first element, a second element, and a third element” denotes the combination of all elements proposed from two or more of the first element, the second element, and the third element as well as the first element, the second element, or the third element.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic device which is a final product including an LCM or an OLED module may be referred to as a set device. For example, the narrow-sense display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to the present embodiment may use all types of display panels such as a liquid crystal display panel, an organic light emitting diode (OLED) display panel, and an electroluminescent display panel, but is not limited to a specific display panel which is vibrated by a sound generation device according to the present embodiment to output a sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, the present embodiment is not limited to the metal plate, and the display panel may include another structure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus and a vehicle including the same according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the present disclosure, the detailed description may be omitted. Also, for convenience of description, a scale of each of elements illustrated in the accompanying drawings differs from a real scale, and thus, is not limited to a scale illustrated in the drawings.

In a case where sound devices for outputting a sound are divisionally disposed, a display panel may be used as a vibration plate. A divisionally-disposed vibration generating device may use the display panel as one vibration plate, and due to this, it may be difficult to output a desired sound corresponding to each position or position-based different haptic vibrations. Also, since one vibration plate is used, it may be difficult to match an image with a sound, and it may be difficult to realize vibrations having different sound bands at positions of the display panel. Also, since one vibration plate is used, it may be difficult to match a position-based image with a position-based sound. Therefore, the inventors have performed various experiments for implementing vibration plates divided based on vibration generating devices which are divisionally disposed. Through the various experiments, the inventors have implemented a vibration generating device having a new structure for realizing a sound and a haptic vibration. This will be described below.

Figure 2:
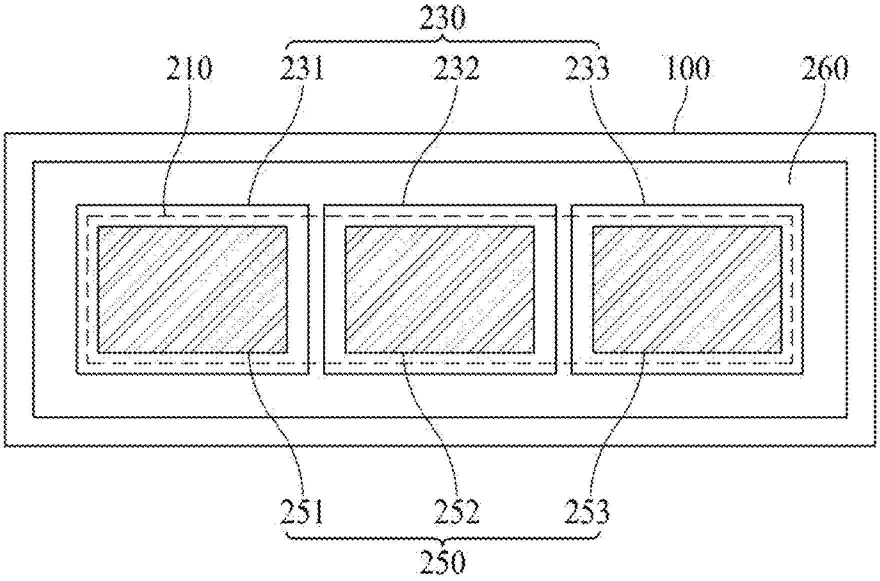
FIG. 2 is a plan view of a display apparatus according to an embodiment of the present disclosure.
Figure 3:
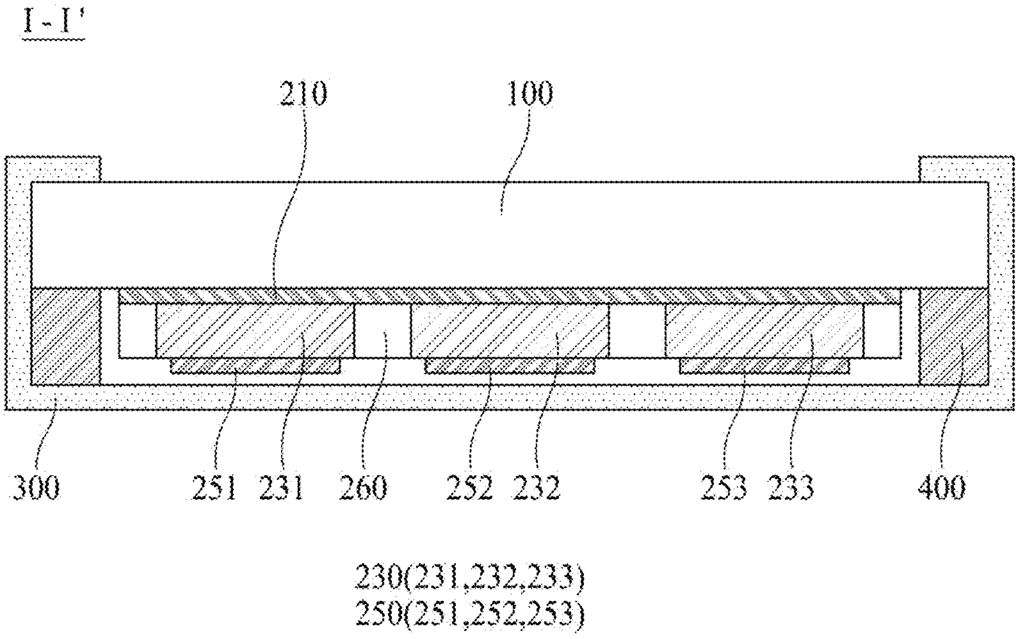
FIG. 3 is a cross-sectional view taken along line I-I' illustrated in FIG. 1.

FIG. 1 illustrates a display apparatus according to an embodiment of the present disclosure. FIG. 2 is a plan view of the display apparatus according to an embodiment of the present disclosure. FIG. 3 is a cross-sectional view taken along line I-I' illustrated in FIG. 1.

With reference to FIGS. 1 to 3, display apparatus 10 according to an embodiment of the present disclosure may include a display panel 100, a vibration generating device 200, a supporting member 300, and a connection member 400.

The vibration generating device 200 may vibrate the display panel 100 to output sound to a forward region with respect to the display panel 100 and to output a haptic vibration. For example, the vibration generating device 200 may directly vibrate the display panel 100 to output sound to the forward region with respect to the display panel 100 and to output the haptic vibration. The vibration generating device 200 may be referred to as an actuator, an exciter, or a transducer, but the term is not limited thereto. For example, the vibration generating device 200 may be a sound device for outputting sound based on an electrical signal.

The display panel 100 may display an image (for example, an electronic image or a digital image) and may be implemented as a curved display panel or any type of display panels such as a liquid crystal display panel, an organic light emitting display panel, a quantum dot light emitting display panel, a micro light emitting diode display panel, and an electroluminescent display panel. The display panel 100 is not limited to a specific display panel and may vibrate based on a vibration of a vibration generating device to generate a sound wave or a sound or may generate a haptic feedback responding to a touch.

The display panel 100 according to an embodiment of the present disclosure may include a thin film transistor (TFT) array substrate which includes a plurality of pixels defined by a plurality of gate lines and a plurality of data lines and a TFT in each of the plurality of pixels for driving a corresponding pixel, a light emitting device layer on the TFT array substrate, and an encapsulation substrate covering the light emitting device layer. Here, the encapsulation substrate may protect the TFT and the light emitting device layer from an external impact and may prevent water or moisture from penetrating into the light emitting device layer.

The display panel 100 according to an embodiment of the present disclosure may include a display area AA which displays an image according to driving of the plurality of pixels, a non-display area which surrounds the display area AA, and a bending area BA which is provided to overlap the display area and the non-display area and forms a curved surface at a side surface of the display panel 100. For example, the bending area BA may be an area which is bent or curved to have a curved shape or a certain curvature radius.

The bending area BA of the display panel 100 may be provided in at least one of one edge or periphery and the other edge or periphery of the display panel 100 which are parallel to each other. The one edge or peripehry and/or the other edge or periphery, where the bending area BA is provided, of the display panel 100 may include only the non-display area, or may include an edge or periphery of the display area AA and the non-display area. For example, the display panel 100 including the bending area BA by bending of the non-display area may have a structure where a one-side bezel bending structure or a both-side bezel bending structure. The display panel 100 including the edge or periphery of the display area AA and the bending area BA by bending of the non-display area may have a structure where a one-side active bending structure or a both-side active bending structure.

The display apparatus 10 according to an embodiment of the present disclosure may further include the supporting member 300 that supports the display panel 100 and the connection member 400 that is disposed between the display panel 100 and the supporting member 300.

The supporting member 300 may be referred to as a cover bottom, a plate bottom, a back cover, a base frame, a metal frame, a metal chassis, a chassis base, or an m-chassis. Therefore, the supporting member 300 may be a supporter that supports the display panel 100, and may be implemented as an arbitrary type frame or a plate structure, on a rear surface of the display apparatus.

The supporting member 300 according to an embodiment of the present disclosure may include at least one of a glass material, a metal material, and a plastic material each having a plate shape covering a whole rear surface of the display panel 100 with a gap space therebetween. Here, an edge or a sharp corner of the supporting member 300 may have an inclined shape or a curved shape through a chamfer process or a corner rounding process. For example, the glass material of the supporting member 300 may be sapphire glass. As another example, the supporting member 300 including the metal material may include one of aluminum (Al), an Al alloy, a magnesium (Mg) alloy, and an iron (Fe)-nickel (Ni) alloy.

The supporting member 300 according to an embodiment of the present disclosure may additionally cover a side surface of the display panel 100. For example, the supporting member 300 may include a rear portion that covers a rear surface of the display panel 100 and a side portion that is connected to an end of the rear portion and covers the side surface of the display panel 100. For example, the rear portion may cover a portion or all of the rear surfaces of the display panel 100. For example, the side portion may cover a portion or all of the side surfaces of the display panel 100. However, an embodiment of the present disclosure is not limited thereto, and the rear portion and the side portion of the supporting member 300 may be provided as one body.

The side portion may be implemented as a separated middle frame coupled or connected to the supporting member 300. For example, the side portion implemented as the middle frame may cover the supporting member 300, and for example, may cover all of a side surface of the rear portion and the side surface of the display panel 100. For example, the side portion implemented as the middle frame may cover all of a side surface of the rear portion of the supporting member 300 and the side surface of the display panel 100. For example, the side portion implemented as the middle frame may include a material that is the same as or different from that of the supporting member 300.

The supporting member 300 according to an embodiment of the present disclosure may be coupled or connected to a rear edge or periphery of the display panel 100 by using the connection member 400.

The connection member 400 may be between the rear edge or periphery of the display panel 100 and an edge or periphery of the supporting member 300 and may attach the display panel 100 to the supporting member 300. The connection member 400 according to an embodiment of the present disclosure may be implemented with a double-sided tape, a single-sided tape, a double-sided foam tape, a single-sided foam tape, a double-sided adhesive foam pad, or a single-sided adhesive foam pad, but embodiments are not limited thereto.

The vibration generating device 200 may be on the rear surface of the display panel 100. The rear surface of the display panel 100 may be referred to as one surface, a first surface, a rear surface, or a lower surface, but the term is not limited thereto. For example, the vibration generating device 200 may be implemented with at least one of a vibration plate that outputs sound and a vibration plate that outputs a haptic vibration.

The vibration generating device 200 may be referred to as a sound generating module, a sound generating device, a film actuator, a film type piezoelectric composite actuator, a film speaker, a film type piezoelectric speaker, or a film type piezoelectric composite speaker which each uses the display panel 100 as a vibration plate, but the term is not limited thereto.

The vibration generating device 200 according to an embodiment of the present disclosure may include piezoelectric ceramic for securing a piezoelectric characteristic (or a vibration characteristic) and may include a material such as a polymer for complementing the impact resistance and flexibility of the piezoelectric ceramic having a fragile characteristic.

The vibration generating device 200 according to an embodiment of the present disclosure may be divisionally disposed for realizing a stereo sound and a haptic vibration.

For example, the vibration generating device 200 may be divisionally disposed in each of at least three regions or portions on the basis of a region or a position of the display panel 100.

With reference to FIGS. 1 to 3, the vibration generating device 200 according to an embodiment of the present disclosure may include a piezoelectric member 230 and first and second electrodes 210 and 250 respectively disposed on an upper surface and a lower surface of the piezoelectric member 230.

The piezoelectric member 230 may include a plurality of piezoelectric members. For example, in the piezoelectric member 230, three or more piezoelectric members may be divisionally disposed. For example, the plurality of piezoelectric members may include a first piezoelectric member 231, a second piezoelectric member 232, and a third piezoelectric member 233.

The piezoelectric member 230 according to an embodiment of the present disclosure may include a piezoelectric material having a piezoelectric effect. Here, the piezoelectric effect may denote a phenomenon where, as pressure or twisting is applied to a crystalline structure by an applied force, a potential difference occurs due to dielectric polarization caused by a relative position change of a lattice structure including a material of a piezoelectric member. Therefore, the piezoelectric member 230 may repeatedly expand and contract with an external power source or an electric field applied through the first electrode 210 and the second electrode 250 to generate a vibration.

The piezoelectric member 230 according to an embodiment of the present disclosure may include piezoelectric materials, a binder for binding the piezoelectric materials, and a surface treatment agent for dispersing the piezoelectric materials. For example, the piezoelectric member 230 may include piezoelectric materials of about 70% to about 90%, a binder of about 5% to about 20%, and a surface treatment agent of about 5% to about 10%.

The piezoelectric material according to an embodiment of the present disclosure may include a piezoelectric material having a perovskite crystalline structure. The perovskite crystalline structure may have a piezoelectric effect, an inverse piezoelectric effect, and alignment or orientation properties. The perovskite crystalline structure may be represented by a chemical formula "$ABO_3$." In the chemical formula, "A" may include a divalent metal element, and "B" may include a tetravalent metal element. For example, in the chemical formula "$ABO_3$", A and B may be cations, and O may be anions. For example, the chemical formula "$ABO_3$" may include one of lead(II) titanate ($PbTiO_3$), lead zirconate ($PbZrO_3$), barium titanate ($BaTiO_3$), and strontium titanate ($SrTiO_3$), but embodiments are not limited thereto.

When the perovskite crystalline structure includes a center ion (for example, $PbTiO_3$), a position of a titanium (Ti) ion may be changed by an external stress or a magnetic field. Thus, polarization may be changed, thereby generating a piezoelectric effect. For example, in the perovskite crystalline structure, a cubic shape corresponding to a symmetric structure may be changed to a tetragonal, orthorhombic, or rhombohedral structure corresponding to an unsymmetric structure, and thus, a piezoelectric effect may be generated. In a tetragonal, orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

As another example, an inorganic material part may include one or more of lead (Pb), zirconium (Zr), titanium (Ti), zinc (Zn), nickel (Ni), and niobium (Nb), but embodiments are not limited thereto. As another example, the piezoelectric material may include a lead zirconate titanate (PZT)-based material including lead (Pb), zirconium (Zr), and titanium (Ti) and a lead zirconate nickel niobate (PZNN)-based material including lead (Pb), zinc (Zn), nickel (Ni), and niobium (Nb), but embodiments are not limited thereto. Also, the inorganic material part may include at least one of calcium titanate ($CaTiO_3$), barium titanate ($BaTiO_3$), and strontium titanate ($SrTiO_3$), each without Pb, but embodiments are not limited thereto. As another example, the inorganic material part may include piezoelectric ceramic having a wurtzite crystalline structure. For example, the inorganic material part may include at least one of aluminum nitride (AlN), silver iodide (AgI), zinc oxide (ZnO), cadmium sulfide (CdS), cadmium selenide (CdSe), silicon carbide ($\alpha$-SiC), gallium(III) nitride (GaN), and boron nitride (BN), but embodiments are not limited thereto.

The binder of the piezoelectric member 230 according to an embodiment of the present disclosure may include a dielectric elastomer having a low elastic modulus. For example, the binder may include at least one or more of an acrylic-based polymer, a silicone-based polymer, and an epoxy-based polymer. As another example, the binder may include at least one or more of polyvinyl chloride (PVC), silicones, PVDF gel materials, and urethane, but embodiments are not limited thereto.

Moreover, the piezoelectric member 230 including the binder according to an embodiment of the present disclosure may have flexibility, and when the display apparatus 10 according to an embodiment of the present disclosure is a flexible display apparatus or a foldable display apparatus, the piezoelectric member 230 may be on a rear surface of the display panel 100 and may be bent or stretched based on a variation of a curvature of the display panel 100. Accordingly, the piezoelectric member 230 according to an embodiment of the present disclosure may include a film, and thus, flexibility may be enhanced compared to a vibration generating device including a piezoelectric element, thereby providing a vibration generating device with enhanced flexibility. For example, the vibration generating device according to an embodiment of the present disclosure may be a film-type vibration generating device.

The surface treatment agent in the piezoelectric member 230 according to an embodiment of the present disclosure may use a material such as hydrogen peroxide ($H_2O_2$), PVA, SiOH, and thus, may react with at least a portion of a surface of the piezoelectric material to vary a characteristic of the surface and may enhance a degree of dispersion of the piezoelectric material in the piezoelectric member 230. The surface treatment agent may be a dispersing agent or a solvent.

The piezoelectric member 230 according to an embodiment of the present disclosure may include a plurality of piezoelectric members 231, 232, 233. When the piezoelectric member 230 is provided in plurality, the plurality of piezoelectric members 230 may be spaced apart from one another by a certain interval or distance so that interference is offset by a vibration generated by an adjacent piezoelectric member 230 or does not occur. Accordingly, a sound may be transferred to a user without interference caused by a sound generated in the piezoelectric member 230.

To realize a stereo sound and a haptic vibration, the piezoelectric members 230 may be divisionally disposed, and thus, the inventors have recognized that a vibration plate corresponding to the divided piezoelectric member 230 should be separately provided. For example, when three piezoelectric members are divisionally disposed, three vibration plates may be needed for vibrating three piezoelectric members. Therefore, the inventors have performed various experiments on a case where a separate vibration plate is not needed when the piezoelectric members 230 are divisionally disposed. Through the various experiments, the inventors have recognized that a structure should be provided between several piezoelectric members. The inventors have recognized that the structure should be provided between piezoelectric members and should include a material which expands and contracts based on movement of ions when a voltage is applied thereto.

Therefore, the vibration generating device 200 according to an embodiment of the present disclosure may include a damping member 260 between adjacent piezoelectric members 230. The damping member 260 may be provided based on the number of piezoelectric members 230. Therefore, the damping member 260 may act as a vibration plate of each of the first to third piezoelectric members 231, 232, 233 and sound interference between the first to third piezoelectric members 231, 232, 233 may be solved. For example, when three piezoelectric members 230 are divisionally disposed, the damping member 260 may include three or more holes or opening portions, but embodiments are not limited thereto.

For example, the damping member 260 may be disposed to surround at least a portion of the piezoelectric member 230. The damping member 260 may be disposed to surround a side portion of the piezoelectric member 230. For example, the damping member 260 may be disposed to surround all of the side portions of the piezoelectric member 230. The damping member 260 may be disposed to fill a separation space or gap between the first to third piezoelectric members 231, 232, 233. For example, the damping member 260 may be disposed between the first to third piezoelectric members 231, 232, 233.

Therefore, the damping member 260 may attenuate a vibration component, which is propagated to a side surface of the piezoelectric member 230, of a vibration component generated by the piezoelectric member 230. For example, the damping member 260 may be disposed to surround a side portion of the piezoelectric member 230, and thus, the damping member 260 may attenuate a vibration component, which is propagated to the side portion of the piezoelectric member 230, of a vibration component generated based on the contraction and expansion of the piezoelectric member 230. Accordingly, each of the first to third piezoelectric members 231, 232, 233 may minimize a reduction in sound performance caused by interference and offset by an adjacent piezoelectric member. However, the term is not limited thereto.

The damping member 260 according to an embodiment of the present disclosure may include a material which expands and contracts based on movement of ions when a voltage is applied thereto. Therefore, a restoring force based on the contraction and expansion of a vibration of the piezoelectric member 230 may be enhanced, and the damping member 260 may act as a vibration plate of the piezoelectric member 230. The damping member 260 may include a material having an elastic modulus which is lower than that of the piezoelectric member 230. For example, the damping member 260 may include a dielectric elastomer, but is not limited thereto. According to an embodiment of the present disclosure, the damping member 260 may include at least one or more of an acrylic-based polymer, a silicone-based polymer, and an epoxy-based polymer. As another example, the damping member 260 may include at least one or more of polyvinyl chloride (PVC), silicones, PVDF gel materials, and urethane, but embodiments are not limited thereto. Therefore, the damping member 260 may have an elastic modulus that is lower than that of the piezoelectric member 230, and thus, may have an excellent restoring force with respect to the contraction and expansion of the vibration generating device 200.

Moreover, as illustrated in FIGS. 2 and 3, the plurality of piezoelectric members 230 of the vibration generating device 200 may include three piezoelectric members 231, 232, 233, but embodiments are not limited thereto and may be freely disposed based on requirements for display apparatuses. According to an embodiment of the present disclosure, the plurality of piezoelectric members 230 may be freely disposed in a predetermined region of the display panel 100, for realizing a sound output and a haptic vibration, and the first electrode 210, the damping member 260, and the second electrode 250 may be provided to correspond to a region where each of the plurality of piezoelectric members 230 is disposed.

Therefore, the vibration generating device 200 according to an embodiment of the present disclosure may be implemented as one film type having a divided vibration plate. Accordingly, the vibration generating device 200 may have a thin thickness, and thus, a thickness of the display panel 100 may not increase due to the vibration generating device 200. Also, the vibration generating device 200 according to an embodiment of the present disclosure may be implemented as one film type without separately providing a plurality of vibration plates based on a plurality of piezoelectric members, thereby implementing the vibration generating device 200 having a thin thickness.

The display apparatus 10 according to an embodiment of the present disclosure may include a first electrode 210 disposed under the display panel 100. The first electrode 210 may be electrically connected to the piezoelectric member 230. When the piezoelectric member 230 includes the first to third piezoelectric members 231, 232, 233, the first electrode 230 according to an embodiment of the present disclosure may be provided as a single body to correspond to a region where each of the plurality of piezoelectric members 231, 232, 233 is provided. For example, when the piezoelectric member 230 of the vibration generating device 200 includes the first to third piezoelectric members 231, 232, 233, the first electrode 210 may be configured as one electrode. For example, the first electrode 210 may be a positive (+) electrode, and a below-described second electrode 250 may be a negative (−) electrode, and vice versa.

The first electrode 210 may include a metal material which is high in electric conductivity. The first electrode 210 may include one of conductive metals including platinum (Pt), gold (Au), silver (Ag), aluminum (Al), and copper (Cu). The first electrode 210 may be formed by a physical vapor deposition (PVD) process such as a sputtering process. As another example, the first electrode 210 may be formed of conductive metal by using at least one of a spray process, a screen printing process, an inkjet printing process, and a doctor blade process. However, a process of forming the first electrode 210 is an example, but embodiments are not limited thereto.

The second electrode 250 may be disposed under the piezoelectric member 230. The second electrode 250 may be patterned to correspond to a region where the piezoelectric member 230 is provided. The material of the second electrode 250 may be the same as the first electrode 210, and thus, its repetitive description is omitted. According to an embodiment of the present disclosure, the second electrode 250 may be disposed to overlap at least a portion of each of the first to third piezoelectric members 231, 232, 233 so as to correspond to a shape and a pattern of each of the first to third piezoelectric members 231, 232, 233. For example, the second electrode 250 may be formed through patterning and deposition such as a sputtering process. For example, a 2-1 electrode 251 may be disposed to correspond to the first piezoelectric member 231, a 2-2 electrode 252 may be disposed to correspond to the second piezoelectric member 232, and a 2-3 electrode 253 may be disposed to correspond to the third piezoelectric member 233.

In the vibration generating device 200 according to an embodiment of the present disclosure, the damping member 260 may be provided to surround a side portion of the piezoelectric member 230 or may be provided between adjacent piezoelectric members 230, and thus, a vibration component, which is propagated to the side portion of the piezoelectric member 230, of a vibration component generated based on the piezoelectric effect of the piezoelectric member 230 may be minimized. In the vibration generating device 200 according to an embodiment of the present disclosure, the damping member 260 may be provided to surround the side portion of the piezoelectric member 230 or may be provided between adjacent piezoelectric members 230, thereby enhancing linearity corresponding to a vibration component, which is propagated to the display panel 100, of a vibration component generated based on the piezoelectric effect of the piezoelectric member 230. Therefore, the display apparatus 10 according to an embodiment of the present disclosure may control a vibration component of the vibration generating device 200 corresponding to a certain region of the display panel 100. For example, the display apparatus 10 according to an embodiment of the present disclosure may be implemented so that the display panel 100 which is a vibration plate is divided into three portions (for example, first to third portions) by the damping member 260, and thus, outputs different sounds. For example, when the piezoelectric member 230 according to an embodiment of the present disclosure includes three piezoelectric members, a first portion of the display panel 100 may output a sound of a high-pitched sound band, a second portion of the display panel 100 may output a sound of a middle-pitched sound band, and a third portion of the display panel 100 may output a sound of a low-pitched sound band. Therefore, the vibration generating device 200 according to an embodiment of the present disclosure may be implemented as a sound generating device. The sound generating device may output sound having different frequency ranges. For example, the vibration generating device 200 according to an embodiment of the present disclosure may be configured with a plurality of sound generating devices, thereby implementing a sound generating device for outputting sound of the low-pitched sound band, the middle-pitched sound band, and the high-pitched sound band. For example, the low-pitched sound band may be 200 Hz or less, the middle-pitched sound band may be about 200 Hz to about 3 kHz, and the high-pitched sound band may be 3 kHz or more. However, embodiments are not limited thereto.

Moreover, the vibration generating device 200 according to an embodiment of the present disclosure may be implemented as a haptic device. The haptic device may be implemented as a haptic device which outputs a low frequency or an ultrasonic wave. For example, the vibration generating device 200 may vibrate based on a haptic feedback signal (or a tactile feedback signal) synchronized with a user touch applied to a touch panel (or a touch sensor layer) which is disposed on the display panel 100 or is embedded into the display panel 100, thereby vibrating the display panel 100. Therefore, the vibration generating device 200 may output a haptic vibration which is independently differentiated with respect to the first portion and the second portion of the display panel 100. For example, the haptic device may be implemented independently from a haptic vibration of an adjacent haptic device. Accordingly, a separate vibration generating device may not be provided for a haptic vibration, and a haptic vibration may be realized by the vibration generating device.

Figure 4:
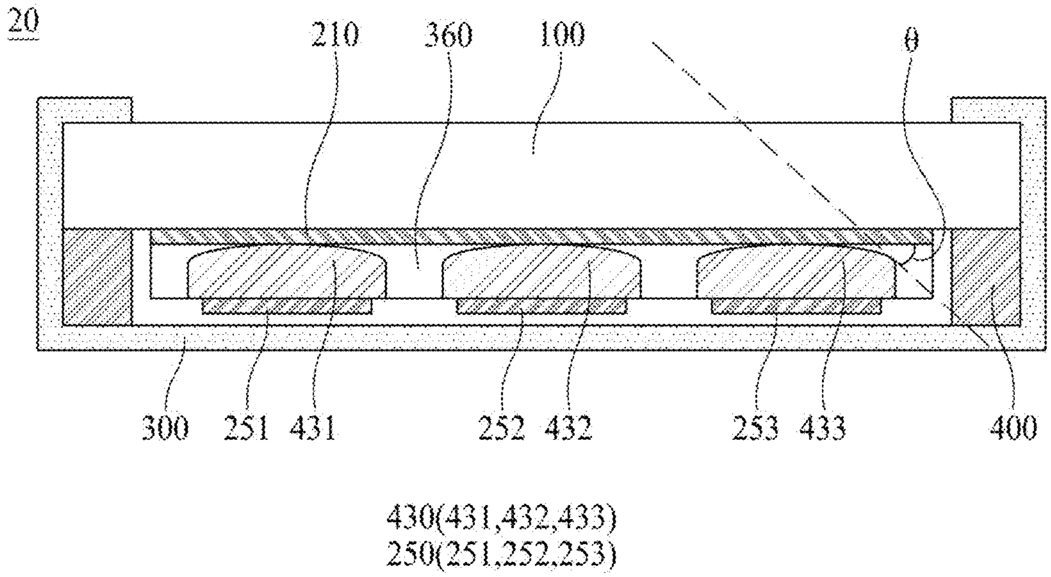
FIG. 4 illustrates a display apparatus according to another embodiment of the present disclosure.

FIG. 4 illustrate a display apparatus according to another embodiment of the present disclosure.

As illustrated in FIG. 4, each of first to third piezoelectric members 431, 432, 433 of the display apparatus 20 according to another embodiment of the present disclosure may include a protrusion portion including a curved surface portion provided on one surface thereof, and the protrusion portion may be provided to face a first electrode 210. A sound output characteristic of the display apparatus 20 according to another embodiment of the present disclosure may vary based on an angle "θ" between the first electrode 210 and a virtual normal line with respect to an intersection point between a curved protrusion portion and a side surface of the piezoelectric member 430. The sound output characteristic based on the angle "θ" between the first electrode 210 and the virtual normal line with respect to the intersection point between the curved protrusion portion and the side surface of the piezoelectric member 430 will be described below with reference to FIGS. 11A, 11B, and 12.

A damping member 360 according to an embodiment of the present disclosure may be provided to surround a portion, other than a lower surface at which the piezoelectric member 430 contacts a second electrode 250, of the piezoelectric member 430. The damping member 360 may be disposed to surround a portion, other than a portion at which the piezoelectric member 430 contacts the first electrode 210, of the piezoelectric member 430. For example, the damping member 360 may be disposed to surround a portion of the piezoelectric member 430. For example, the damping member 360 may be disposed between adjacent piezoelectric members 430. Therefore, the damping member 360 may transfer a vibration generated by a corresponding piezoelectric member 430 and may prevent interference caused by a vibration generated by another adjacent piezoelectric member 430.

For example, the damping member 360 may be configured to have a characteristic of an electroactive material. The damping member 360 may further include a material having a piezoelectric material so as to more enhance a sound pressure characteristic or a haptic vibration of the vibration generating device. For example, the damping member 360 may include an organic and inorganic composite. A material having a piezoelectric characteristic may be piezoelectric ceramic, but is not limited thereto. The damping member 360 may include a dielectric elastomer and a piezoelectric ceramic material. For example, the damping member 360 may be a composite where a dielectric elastomer is mixed with a fiber-type piezoelectric ceramic material. For example, the damping member 360 may be a composite where a dielectric elastomer having a low elastic modulus is mixed with a piezoelectric ceramic material having a high polarization characteristic. For example, the damping member 360 according to another embodiment of the present disclosure may include a piezoelectric material of about 5% to about 50% and a dielectric elastomer of about 95% to about 50%.

The piezoelectric material included in the damping member 360 may be a piezoelectric fiber or a piezoelectric ceramic fiber. For example, a shape of the piezoelectric fiber may be at least one of a tetragonal shape, a circular pillar shape, and a rod shape, but embodiments are not limited thereto. A diameter of the piezoelectric fiber may be about 0.1 μm to about 500 μm, but embodiments are not limited thereto. According to an embodiment of the present disclosure, the damping member 360 may include at least one of an acrylic-based polymer, a silicone-based polymer, and an epoxy-based polymer. As another example, the damping member 360 may include at least one of PVC, silicones, PVC gel materials, PVDF gel materials, and urethane, but is not limited thereto. For example, the piezoelectric ceramic material may include a piezoelectric material such as PZT, PMN-PT, PZT-PNN, $BaTiO_3$, or KNN having a perovskite crystalline structure, but embodiments are not limited thereto. Accordingly, since the damping member 360 includes piezoelectric material, a vibration characteristic and a haptic vibration of the vibration generating device may be more enhanced.

The damping member 360 may be manufactured as follows. Ceramic fibers may be arranged at certain intervals on a substrate. Also, an elastomer may be provided in the ceramic fibers and may be cured. In this state, the damping member 360 may be formed by compressing the ceramic fibers at atmospheric pressure. As another example, an elastomer may be injected into the ceramic fibers arranged at certain intervals by using a capillary phenomenon, thereby forming the damping member 360. However, embodiments are not limited thereto.

With reference to FIG. 4, the first to third piezoelectric members 431, 432, 433 may contact the first electrode 210, but embodiments are not limited thereto. For example, the first to third piezoelectric members 431, 432, 433 and the first electrode 210 may be disposed apart from one another by a certain interval or distance. For example, an interval or distance between each of the first to third piezoelectric members 431, 432, 433 and the first electrode 210 may be about 3 μm or less, but embodiments are not limited thereto. For example, when an interval or distance between each of the first to third piezoelectric members 431, 432, 433 and the first electrode 210 is about 3 μm or less, a vibration characteristic and a haptic vibration of the vibration generating device 200 may be more enhanced.

The damping member 360 described above with reference to FIG. 4 may be substantially similarly applied to the embodiment of FIG. 2. For example, the damping member 260 of FIG. 2 may include a dielectric elastomer and piezoelectric ceramic. Accordingly, a vibration characteristic and a haptic vibration of the vibration generating device 200 may be more enhanced.

Figure 5:
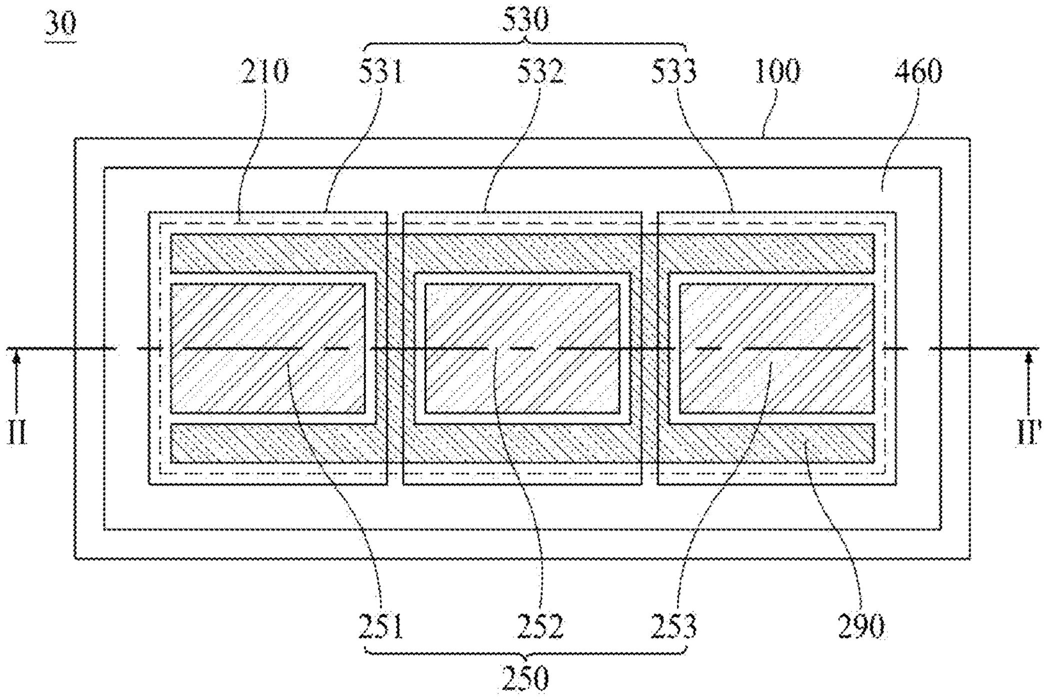
FIG. 5 illustrates a display apparatus according to another embodiment of the present disclosure.
Figure 6:
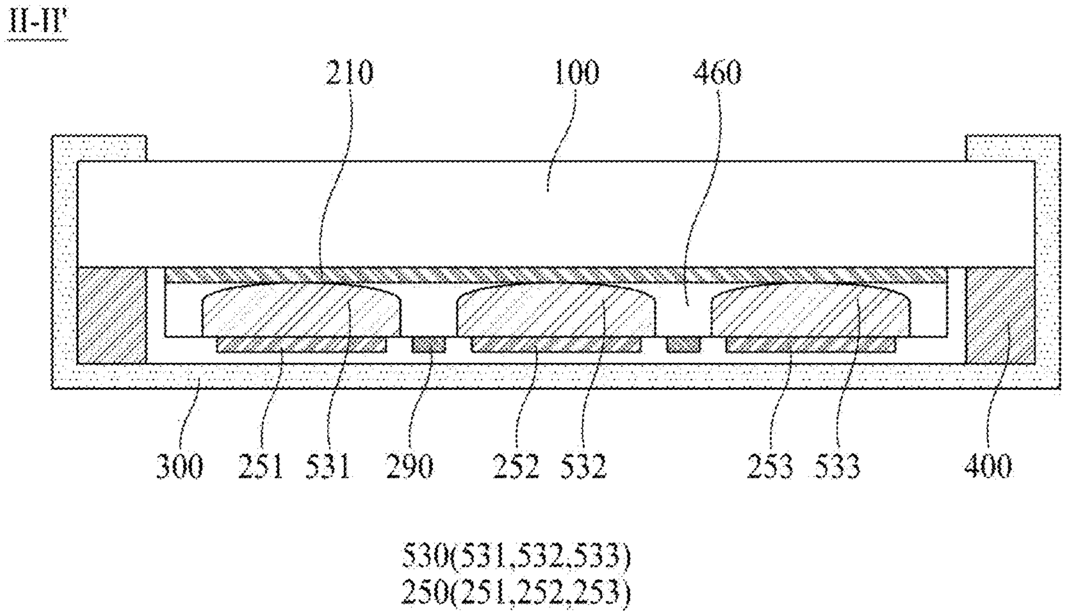
FIG. 6 is a cross-sectional view taken along line II-II' illustrated in FIG. 5.

FIG. 5 illustrates a display apparatus according to another embodiment of the present disclosure. FIG. 6 is a cross-sectional view taken along line II-II' illustrated in FIG. 5.

With reference to FIGS. 5 and 6, the display apparatus 30 according to another embodiment of the present disclosure may include a display panel 100, a vibration generating device 200, a supporting member 300, and a connection member 400. Except for the vibration generating device 200, the display apparatus 30 according to another embodiment of the present disclosure may be the same as the display apparatus 10 of FIGS. 1 to 3, and thus, its detailed description is omitted.

The vibration generating device 200 according to another embodiment of the present disclosure may include a first electrode 210 disposed under the display panel 100, a piezoelectric member 530 disposed under the first electrode 210, a damping member 460 disposed near the piezoelectric member 530, and a second electrode 250 disposed under the piezoelectric member 530. The vibration generating device 200 may further include a third electrode 290 provided to correspond to a lower surface of the damping member 460. Except for the damping member 460 and the third electrode 290, the vibration generating device 200 of the display apparatus 30 according to another embodiment of the present disclosure may be substantially similar to the above description, and thus, its repetitive description is omitted.

The damping member 460 of the vibration generating device 200 according to another embodiment of the present disclosure may include a piezoelectric material dispersed therein. For example, the damping member 460 may include an organic and inorganic composite. The damping member 460 according to another embodiment of the present disclosure may include a piezoelectric material and a dielectric elastomer. For example, the damping member 460 according to another embodiment of the present disclosure may include a piezoelectric material of about 5% to about 50% and a dielectric elastomer of about 50% to about 95%. For example, the dielectric elastomer may include dielectric rubber. For example, the description of FIG. 3 may be identically applied to the dielectric elastomer.

The piezoelectric material included in the damping member 460 may be a piezoelectric fiber or a piezoelectric ceramic fiber. The piezoelectric fiber may include a piezoelectric material having the same perovskite crystalline structure as that of the piezoelectric member 230 described above, but embodiments are not limited thereto. For example, a diameter of the piezoelectric fiber may be about 0.1 μm to about 500 μm, but is not limited thereto. A shape of the piezoelectric fiber may be at least one of a tetragonal shape, a circular pillar shape, and a rod shape, and the piezoelectric material may be used without limitation as long as it is a piezoelectric material in the form of fiber. Since the damping member 460 according to another embodiment of the present disclosure includes piezoelectric material, a vibration characteristic of the vibration generating device may be more enhanced.

The vibration generating device 200 according to another embodiment of the present disclosure may further include a third electrode 290 corresponding to the damping member 460. For example, the third electrode 290 may be disposed to correspond to a lower surface of the damping member 460. For example, the third electrode 290 may be disposed apart from the second electrode 250 by a certain interval not to overlap the second electrode 250. The third electrode 290 may include the same material as that of each of the first and second electrodes 210 and 250 described above.

For example, the damping member 460 may be disposed between the first electrode 210 and the third electrode 290, and thus, may independently operate regardless of an operation of the piezoelectric member 530 based on an external power applied thereto. Therefore, the damping member 460 according to another embodiment of the present disclosure may include an elastomer and a piezoelectric fiber, thereby enhancing a vibration characteristic or a haptic vibration. Also, since the third electrode 290 for driving the damping member 460 is further provided, a vibration characteristic or a haptic vibration of the damping member 460 contributing to a vibration of the vibration generating device 200 may be more enhanced. Accordingly, the damping member 460 may have a material having a piezoelectric characteristic, and thus, a sound pressure output through the display panel 100 may increase based on a vibration generated by the vibration generating device 200, and for example, may increase by about 2 dB.

The damping member 460 and the third electrode 290 described above with reference to FIGS. 5 and 6 may be substantially similarly applied to the embodiment of FIG. 2. For example, the damping member 260 of FIG. 2 may include a dielectric elastomer and a piezoelectric material, and a third electrode may be provided to correspond to the damping member 260. Accordingly, a vibration characteristic and a haptic vibration of the vibration generating device 200 may be more enhanced.

FIGS. 7A to 7E illustrate a method of manufacturing a vibration generating device according to an embodiment of the present disclosure.

FIGS. 7A to 7E illustrate a manufacturing method when a piezoelectric member is liquid, but embodiments are not limited thereto. An example where the manufacturing method of FIGS. 7A to 7E is applied to the vibration generating device of FIG. 3 will be described below, and the manufacturing method of FIGS. 7A to 7E may be substantially similarly applied to a method of manufacturing the vibration generating device of FIGS. 4 to 6.

Figure 7A:
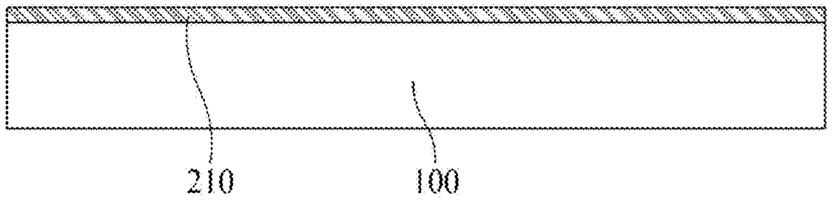
FIGS. 7A to 7E illustrate a method of manufacturing a vibration generating device according to an embodiment of the present disclosure.
Figure 7B:
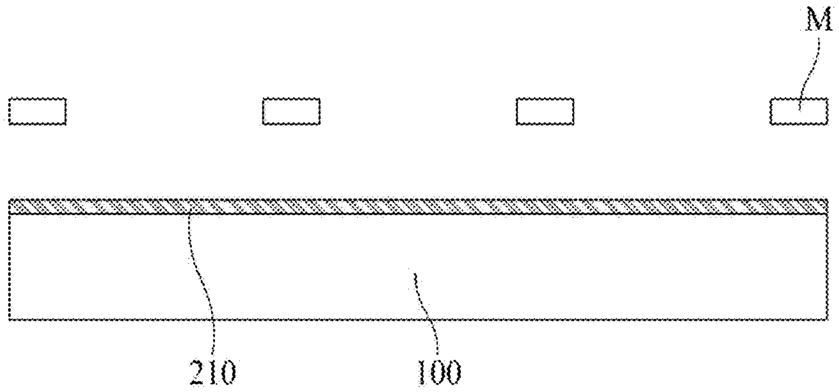

With reference to FIG. 7A, a first electrode 210 may be formed on a display panel 100 or a substrate. The first electrode 210 may be formed through a sputtering process, and then, may be formed through curing. As another example, a conductive paste may be coated thereon, and then, the first electrode 210 may be formed through curing. For example, the conductive paste may be a silver (Ag) paste, but is not limited thereto.

Figure 7C:
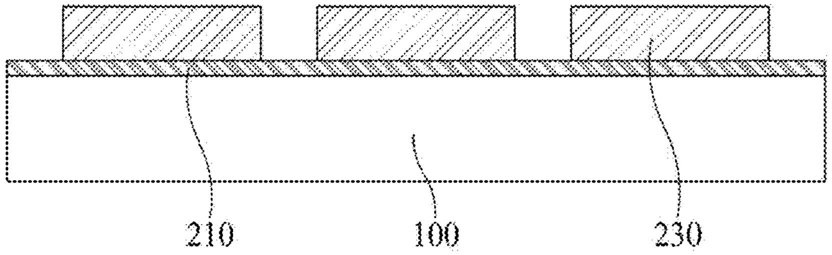

A mask M may be aligned on the display panel 100 or the substrate with the first electrode 210 provided thereon, a region where a piezoelectric member 230 is to be disposed may be prepared (FIG. 7B), and the piezoelectric member 230 may be formed through screen printing or bar coating (FIG. 7C).

Figure 7D:
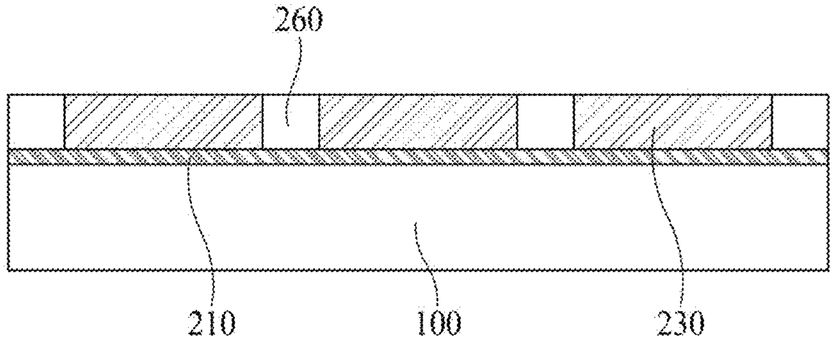
Figure 7E:
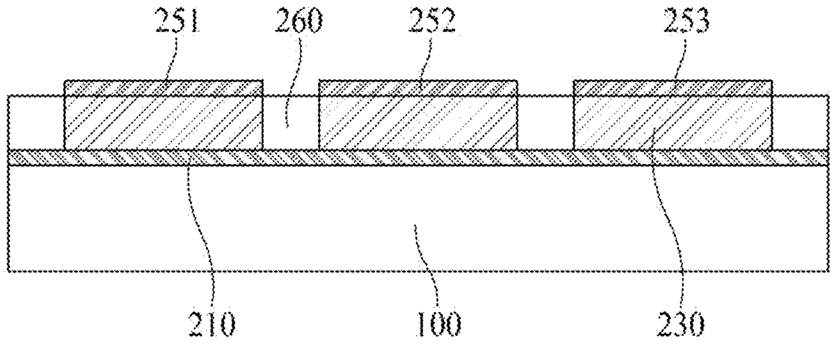

The mask M may be removed, and then, a polymer which is a damping member 260 may be formed (FIG. 7D). For example, the polymer may be urethane or silicone, but embodiments are not limited thereto. The damping member 260 may be formed by curing the polymer. Also, a second electrode 250 may be formed on the piezoelectric member 230 (FIG. 7E). The second electrode 250 may be formed of the same material as that of first electrode 210, but embodiments are not limited thereto. For example, a conductive paste may be coated, and then, by curing the conductive paste, the second electrode 250 may be formed. For example, the conductive paste may be an Ag paste, but embodiments are not limited thereto. A plurality of second electrodes 251, 252, 253 may correspond to first to third piezoelectric members 231, 232, 233. Subsequently, a passivation layer covering each of the first and second electrodes 210 and 250 may be formed, and thus, a process of manufacturing a vibration generating device may finish.

For example, in a case where a piezoelectric member including the curved protrusion portion of FIGS. 4 and 6 is provided, the curved protrusion portion may be formed by patterning the piezoelectric member. For example, in FIG. 7C, a mask may be aligned, and the piezoelectric member including the curved protrusion portion may be formed. For example, the piezoelectric member may be formed at a certain angle by patterning the curved protrusion portion with the mask.

Therefore, in the method of manufacturing the vibration generating device according to an embodiment of the present disclosure, a film-type vibration generating device may be manufactured through a process of forming the damping member 260 between adjacent piezoelectric members 230, thereby simplifying a process of manufacturing the vibration generating device and shortening a time for which the vibration generating device is manufactured.

FIGS. 8A to 8E illustrate a method of manufacturing a vibration generating device according to another embodiment of the present disclosure.

FIGS. 8A to 8E illustrate a manufacturing method when a piezoelectric member is a bar shape or a rod shape, but embodiments are not limited thereto. An example where the manufacturing method of FIGS. 8A to 8E is applied to the vibration generating device of FIG. 3 will be described below, and the manufacturing method of FIGS. 8A to 8E may be substantially similarly applied to a method of manufacturing the vibration generating device of FIGS. 4 to 6.

A pre-process according to an embodiment of the present disclosure may mix and dry ceramic source materials, may crystallize a crystalline structure through a calcination (e.g., firing) process, and may manufacture an inorganic material mother substrate 910 having a plate shape by performing a molding process and a sintering process at least once. For example, the inorganic material mother substrate 910 may include piezoelectric ceramic having a perovskite crystalline structure. The sintering process may use one or more of: heat, pressure, and spark plasma, but embodiments are not limited thereto.

Figure 8A:
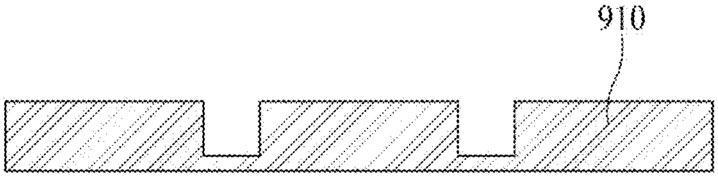
FIGS. 8A to 8E illustrate a method of manufacturing a vibration generating device according to another embodiment of the present disclosure.
Figure 8B:
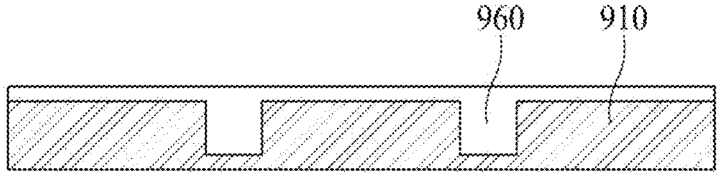
Figure 8C:
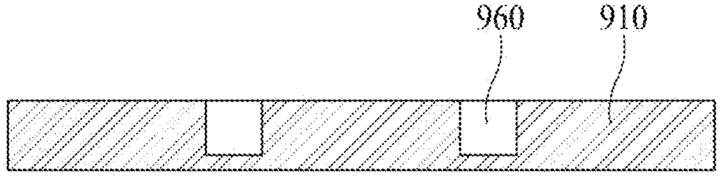

With reference to FIG. 8A, a groove may be formed in the inorganic material mother substrate 910 in a lengthwise direction through dicing and/or the like. A polymer 960 may be injected into or coated on the groove (FIG. 9B). A non-uniform surface of a surface on which the polymer 960 is provided may be planarized through a process such as grinding and polishing.

Figure 8D:
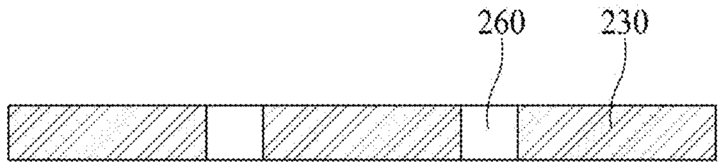

A lower surface of the inorganic material mother substrate 910 may be removed through a process such as grinding and the like, and a piezoelectric member 230 and a damping member 260 may be formed (FIG. 8D).

Figure 8E:
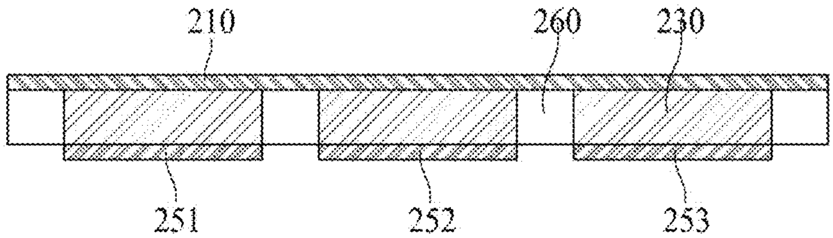

A first electrode 210 and a second electrode 250 may be formed on an upper surface and a lower surface of the piezoelectric member 230 and the damping member 260 (FIG. 8E). A plurality of second electrodes 251, 252, 253 may correspond to first to third piezoelectric members 231, 232, 233. Subsequently, a passivation layer covering each of the first and second electrodes 210 and 250 may be formed, and thus, a process of manufacturing a vibration generating device may end.

For example, when a piezoelectric member including the curved protrusion portion of FIGS. 4 and 6 is provided, the curved protrusion portion may be formed by patterning the piezoelectric member. For example, in FIG. 8D, a mask may be aligned, and the piezoelectric member including the curved protrusion portion may be formed. For example, the piezoelectric member may be formed at a certain angle by patterning the curved protrusion portion with the mask.

Therefore, in the method of manufacturing the vibration generating device according to an embodiment of the present disclosure, a film-type vibration generating device may be manufactured through a process of forming the damping member 260 between adjacent inorganic material mother substrates 910, thereby simplifying a process of manufacturing the vibration generating device and shortening a time for which the vibration generating device is manufactured.

Figure 9A:
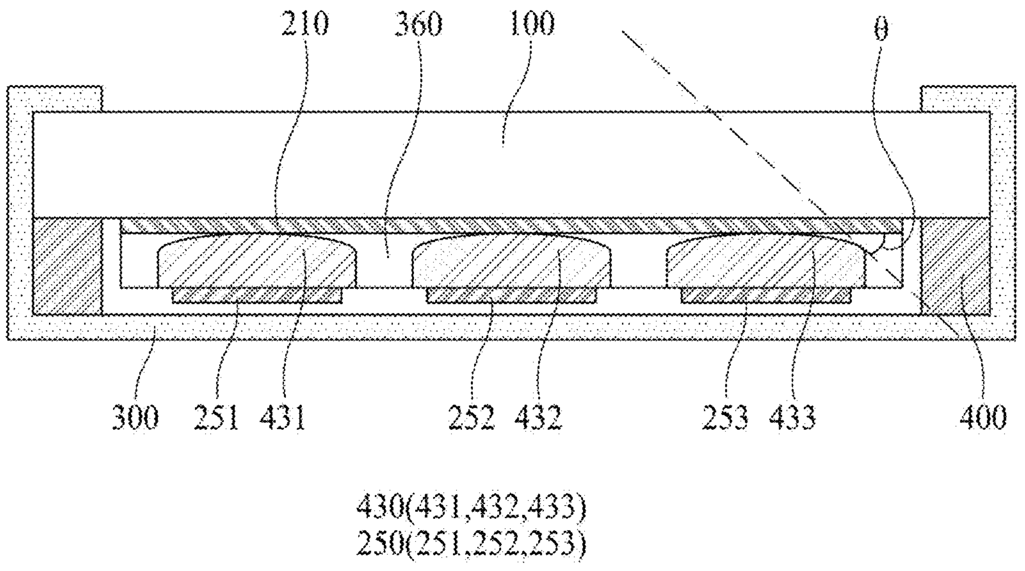
FIGS. 9A and 9B are cross-sectional views for describing a configuration of a display apparatus according to an embodiment of the present disclosure.
Figure 9B:
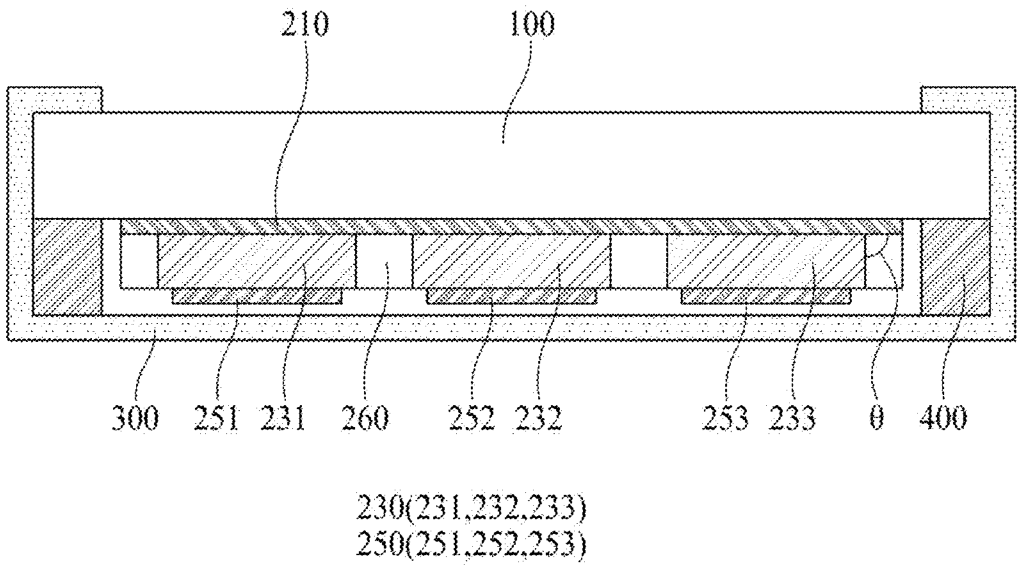
Figure 10:
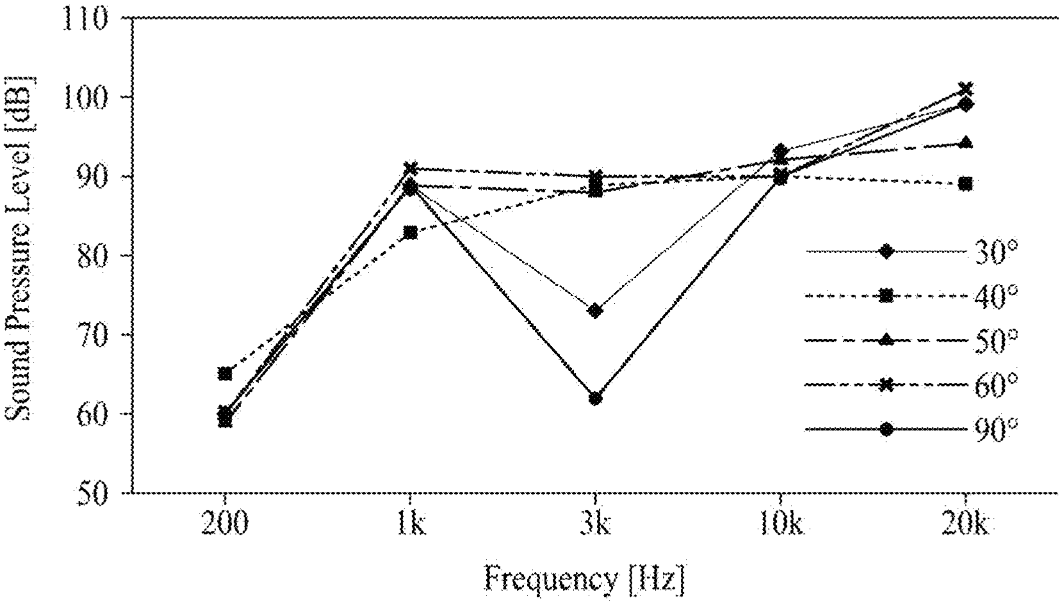
FIG. 10 is a graph showing a sound output characteristic of a display apparatus according to an embodiment of the present disclosure.

FIGS. 9A and 9B are cross-sectional views for describing a configuration of a display apparatus according to an embodiment of the present disclosure. Table 1 shows a sound pressure measurement result of a display apparatus according to the present disclosure. FIG. 10 is a graph showing a sound output characteristic of a display apparatus according to an embodiment of the present disclosure including FIGS. 9A and 9B.

In FIGS. 9A and 9B, a sound output characteristic of a display apparatus has been measured by performing a process of drawing a virtual normal line at a portion at which a side surface of a piezoelectric member intersects a curved protrusion portion starting from one side surface of the piezoelectric member and varying an angle "θ" between the virtual normal line and a first electrode.

In Table 1 and FIG. 10, an input sine waveform has been input to the piezoelectric member 430 through the first and second electrodes 210 and 250 of the vibration generating device 200, and in this case, a voltage of 20 Vrms is applied. The first and second electrodes 210 and 250 include silver (Ag), the vibration generating device 200 uses PZT as a piezoelectric member, and the damping member uses PVC. A sound output characteristic of FIG. 10 has been measured in a state where a microphone is fixed to a portion horizontally apart from a center portion of the display panel 100 by a forward distance of about 20 cm to correspond to the center portion of the display panel 100. In FIG. 10, the abscissa axis represents a frequency in hertz (Hz), and the ordinate axis represents a sound pressure level (SPL) in decibels (dB).

TABLE 1

| | SPL(dB) | | | | |
|---|---|---|---|---|---|
| Frequency | 30° | 40° | 50° | 60° | 90° |
| 200 Hz | 60 | 65 | 59 | 60 | 59 |
| 1k Hz | 89 | 83 | 86 | 91 | 89 |
| 3k Hz | 73 | 89 | 88 | 92 | 62 |
| 10k Hz | 93 | 90 | 92 | 90 | 90 |
| 20k Hz | 99 | 89 | 94 | 101 | 99 |

With reference to Table 1 and FIG. 10, in the display apparatus 20 according to the present disclosure, when an angle "θ" between the first electrode 210 and a virtual normal line with respect to an intersection point between a curved protrusion portion and a side surface of the piezoelectric member 430 is about 40 degrees to about 60 degrees, it may be shown that a flat sound output characteristic appears in the low-pitched sound band, the middle-pitched sound band, and the high-pitched sound band. In an embodiment of the present disclosure where the angle "θ" between the first electrode 210 and the virtual normal line with respect to the intersection point between the curved protrusion portion and the side surface of the piezoelectric member 230 is about 30 degrees or about 90 degrees, it may be shown that a sound pressure of about 3 kHz which is the most important in a clear sound of the display apparatus is reduced. In an embodiment of the present disclosure where the angle "θ" between the first electrode 210 and the virtual normal line with respect to the intersection point between the curved protrusion portion and the side surface of the piezoelectric member 430 is about 40 degrees to about 60 degrees, it may be shown that, comparing with a display apparatus of FIG. 9B where the angle "θ" is about 30 degrees or about 90 degrees, a sound pressure of about 3 kHz increases by about 10 dB to about 30 dB and a uniform sound pressure characteristic appears at about 1 kHz to about 20 kHz.

For example, in an embodiment of the present disclosure where the angle "θ" between the first electrode 210 and the virtual normal line with respect to the intersection point between the curved protrusion portion and the side surface of the piezoelectric member 430 is about 40 degrees, it may be shown that, comparing with a display apparatus where the angle "θ" is about 0 degrees and about 90 degrees, a sound pressure of about 3 kHz increases by about 27 dB. For example, in a case where the angle "θ" is about 40 degrees, it may be seen that a uniform sound pressure characteristic appears at about 1 kHz to about 20 kHz, and it may be seen that a sound pressure characteristic is enhanced in the middle-pitched sound band and the high-pitched sound band.

For example, when the angle "θ" between the first electrode 210 and the virtual normal line with respect to the intersection point between the curved protrusion portion and the side surface of the piezoelectric member 430 is about 40 degrees, the transfer of a vibration to a periphery of the piezoelectric member 430 may be reduced, and the linearity, corresponding to an upper surface of the display panel 100, of a vibration component occurring in the piezoelectric member 430 may be considerably enhanced, thereby enhancing a sound pressure characteristic.

Figure 11A:
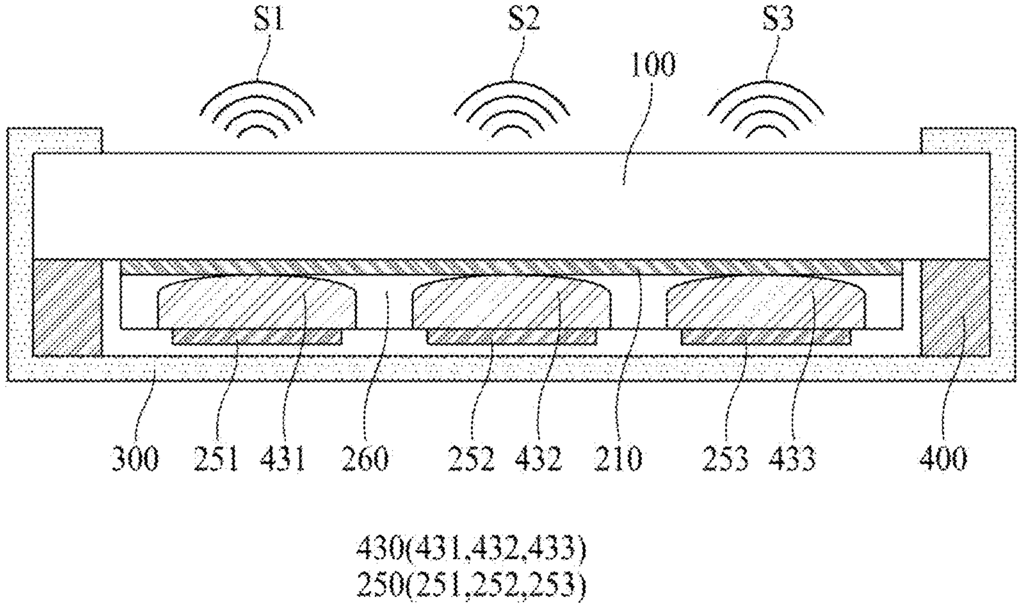
FIGS. 11A and 11B are cross-sectional views of a display apparatus according to an embodiment of the present disclosure and a display apparatus according to a comparative example.
Figure 11B:
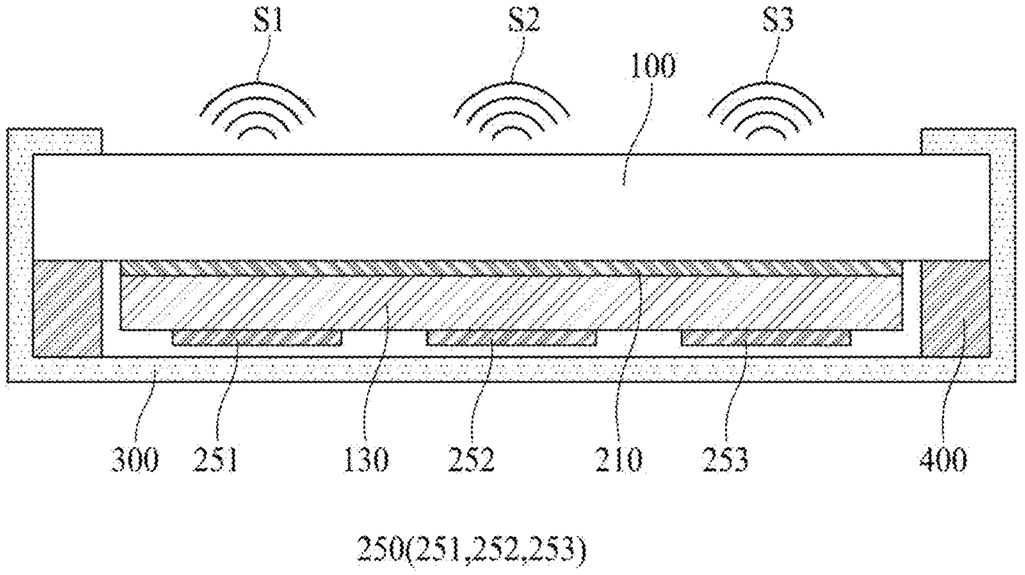

FIGS. 11A and 11B are cross-sectional views of a display apparatus according to an embodiment of the present disclosure and a display apparatus according to a comparative example.

A display apparatus of FIG. 11A illustrates the display apparatus of FIG. 4. Except for that a piezoelectric member 430 is not provided in plurality and is provided as one piezoelectric member 130 to contact a first electrode 210 unlike FIG. 11A, a piezoelectric member of a display apparatus of FIG. 11B is configured as a display apparatus which is the same as the display apparatus of FIG. 11A.

In the display apparatus of FIG. 11A, a set alternating current (AC) voltage has been applied to a first piezoelectric member 431, a second piezoelectric member 432, and a third piezoelectric member 433 so that a display panel 100 corresponding to each of the first to third piezoelectric members 431, 432, 433 outputs a sound of a high-pitched sound band S1 of more than 3 kHz, a sound of a middle-pitched sound band S2 of about 1 kHz to about 3 kHz, and a sound of a low-pitched sound band S3 of less than 1 kHz.

Figure 12:
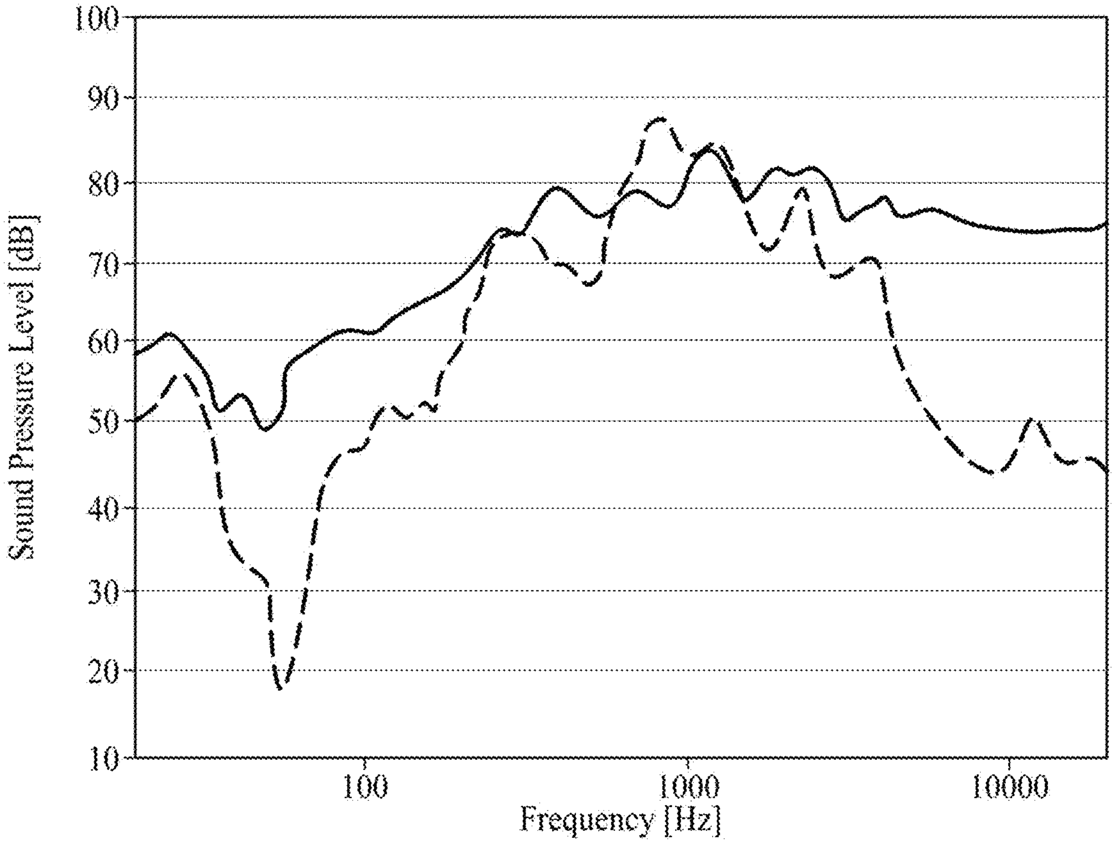
FIG. 12 is a graph showing a sound output characteristic of a display apparatus according to an embodiment of the present disclosure and a sound output characteristic of a display apparatus according to a comparative example.

FIG. 12 is a graph showing a sound output characteristic of a display apparatus according to an embodiment of the present disclosure and a sound output characteristic of a display apparatus according to a comparative example.

FIG. 12 is a graph showing a sound output characteristic of the display apparatus of each of FIGS. 11A and 11B. In FIG. 12, a solid line represents a sound output characteristic of a display apparatus according to an embodiment of the present disclosure, and a dotted line represents a sound output characteristic of a display apparatus according to a comparative example. The display apparatus according to an embodiment of the present disclosure is described with reference to FIG. 4 for example, and even when the vibration generating device of FIGS. 3 and 6 is applied, the same effect or a similar effect may be obtained.

With reference to FIG. 12, comparing with the display apparatus according to the comparative example, it may be seen that the display apparatus according to an embodiment of the present disclosure shows a high sound pressure characteristic. For example, comparing with the display apparatus according to the comparative example, it may be seen that a sound pressure level of the display apparatus according to an embodiment of the present disclosure is enhanced at about 200 Hz or less which is the low-pitched sound band. For example, comparing with a sound pressure level of the display apparatus according to the comparative example, it may be seen that a sound pressure level of the display apparatus according to an embodiment of the present disclosure increases by about 15 dB at about 200 Hz.

For example, comparing with a sound pressure level of the display apparatus according to the comparative example, it may be seen that a sound pressure level of the display apparatus according to an embodiment of the present disclosure increases by about 10 dB or more at about 3 kHz or less which is the middle-pitched sound band.

For example, it may be seen that a sound pressure level of the display apparatus according to the comparative example decreases at about 3 kHz or more which is the high-pitched sound band. For example, comparing with a sound pressure level of the display apparatus according to the comparative example, it may be seen that a sound pressure level of the display apparatus according to an embodiment of the present disclosure increases by about 8 dB to about 30 dB in the high sound band of about 3 kHz or more.

With reference to FIG. 12, in the display apparatus according to an embodiment of the present disclosure, it may be seen that the high-pitched sound band, the middle-pitched sound band, and the low-pitched sound band are separated from one another by a first piezoelectric member 431, a second piezoelectric member 432, and a third piezoelectric member 433. In the display apparatus according to an embodiment of the present disclosure, it may be seen that a stereo sound characteristic is output based on independent driving of the first piezoelectric member 431, the second piezoelectric member 432, and the third piezoelectric member 433. In the display apparatus according to the comparative example, it may be seen that a sound pressure level is reduced in the high-pitched sound band and the low-pitched sound band.

Therefore, the display apparatus according to an embodiment of the present disclosure may include a plurality of vibration generating devices 200, and the vibration generating device may include a plurality of sound generating devices which output sounds having different frequency ranges, thereby providing a display apparatus where a sound pressure level is enhanced in the low to high sound bands. For example, the first piezoelectric member 431, the second piezoelectric member 432, and the third piezoelectric member 433 corresponding to the first portion, the second portion, and the third portion of the display panel 100 may be provided, thereby providing a display apparatus for realizing stereo sound of the high-pitched sound band, the middle-pitched sound band, and the low-pitched sound band. Therefore, the vibration generating device according to an embodiment of the present disclosure may use vibration plates divided by a damping member, and thus, may match an image with a sound to output a local vibration, thereby realizing vibrations of different sound bands based on a position or a portion of the display panel. Also, the vibration plates divided by the damping member may be implemented, thereby providing a vibration generating device which matches an image with a sound based on a position of the display panel.

Figure 13A:
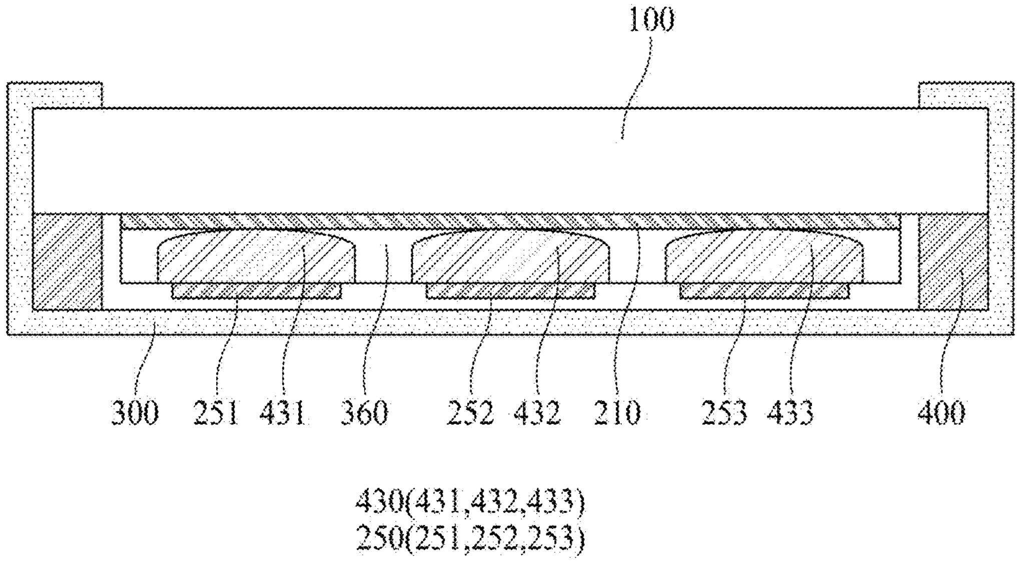
FIGS. 13A and 13B illustrate a haptic characteristic of a display apparatus according to an embodiment of the present disclosure and a haptic characteristic of a display apparatus according to a comparative example.
Figure 13B:
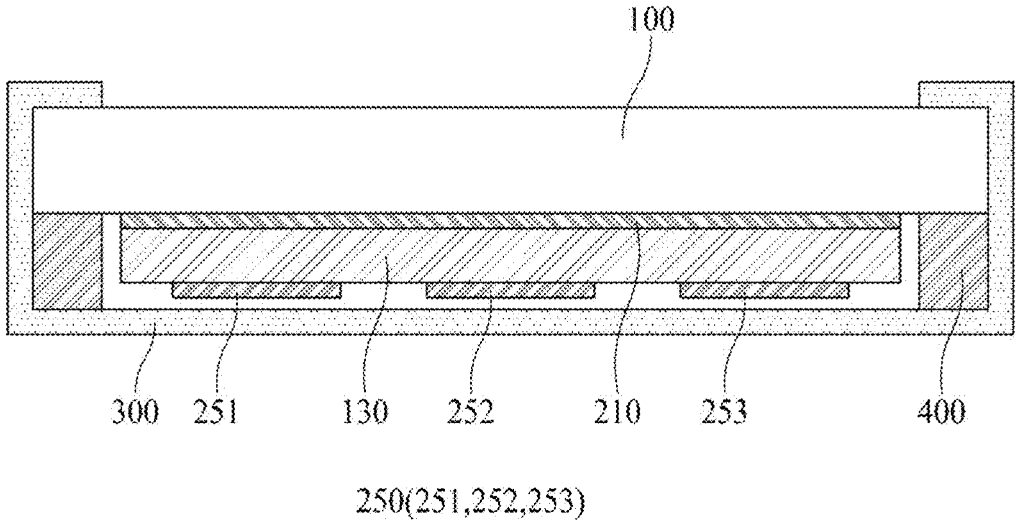

FIGS. 13A and 13B illustrate a haptic characteristic of a display apparatus according to an embodiment of the present disclosure and a haptic characteristic of a display apparatus according to a comparative example.

To evaluate a haptic characteristic of a display apparatus in FIGS. 13A and 13B, a display apparatus of FIG. 13A is configured identically to the display apparatus of FIG. 11A, and a display apparatus of FIG. 13B is configured identically to the display apparatus of FIG. 11B. In FIGS. 13A and 13B, to output a haptic vibration through only the first piezoelectric member 431 of the vibration generating device 200, an input sine waveform has been input to the first piezoelectric member 431 through the first electrode 210 and second electrode 250, and in this case, a voltage of 20 Vrms is applied. The display apparatus according to an embodiment of the present disclosure is described with reference to FIG. 4 for example, and even when the vibration generating device of FIGS. 3 and 6 is applied, the same effect or a similar effect may be obtained.

With reference to a measurement result of a haptic characteristic according to an embodiment of the present disclosure in FIG. 13A, in the display apparatus according to an embodiment of the present disclosure, an acceleration value of about 2.8 G has been measured in a display panel area corresponding to the first piezoelectric member 431, an acceleration value of about 0.7 G has been measured in a display panel area corresponding to the second piezoelectric member 432 to which a voltage is not applied, and an acceleration value of about 0.9 G has been measured in a display panel area corresponding to the third piezoelectric member 433 to which a voltage is not applied.

With reference to a haptic characteristic measurement result of the comparative example in FIG. 13B, an acceleration value of about 3.2 G which is 0.4 G higher than the display apparatus according to an embodiment of the present disclosure in a display panel area corresponding to the first piezoelectric member 431 has been measured in the display apparatus according to the comparative example. In the display apparatus according to the comparative example, an acceleration measurement value of about 2.1 G has been measured in a display panel area corresponding to the second piezoelectric member 432, and an acceleration measurement value of about 3.6 G has been measured in a display panel area corresponding to the third piezoelectric member 433.

With reference to FIGS. 13A and 13B, in the display apparatus according to an embodiment of the present disclosure, it may be seen that, when a voltage for a haptic feedback is applied to the first to third piezoelectric members 431, 432, 433, the haptic feedback is independently output based on the display panel 100 corresponding to the first to third piezoelectric members 431, 432, 433. Accordingly, the vibration generating device according to an embodiment of the present disclosure may include a haptic device, and it may be seen that the haptic device is independently driven from another adjacent haptic device to output different haptic vibrations. For example, the vibration generating device according to an embodiment of the present disclosure may use vibration plates divided by a damping member, and thus, may output different local vibrations at different positions, thereby realizing a haptic vibration having a vibration characteristic which varies based on a position or a portion of the display panel. Also, the vibration plates divided by the damping member may be implemented, thereby providing a haptic device outputting a haptic vibration which varies based on a position of the display panel.

For example, even when the display apparatus according to an embodiment of the present disclosure includes a single vibration generating device 200, the display apparatus according to an embodiment of the present disclosure may include the first to third piezoelectric members 431, 432, 433 and a plurality of second electrodes 251, 252, 253 corresponding thereto. The first to third piezoelectric members 431, 432, 433 may be provided to have a free pattern, and thus, may have a high degree of freedom in design, whereby the display apparatus according to an embodiment of the present disclosure may have an enhanced effect for independently controlling a local haptic characteristic.

Figure 14A:
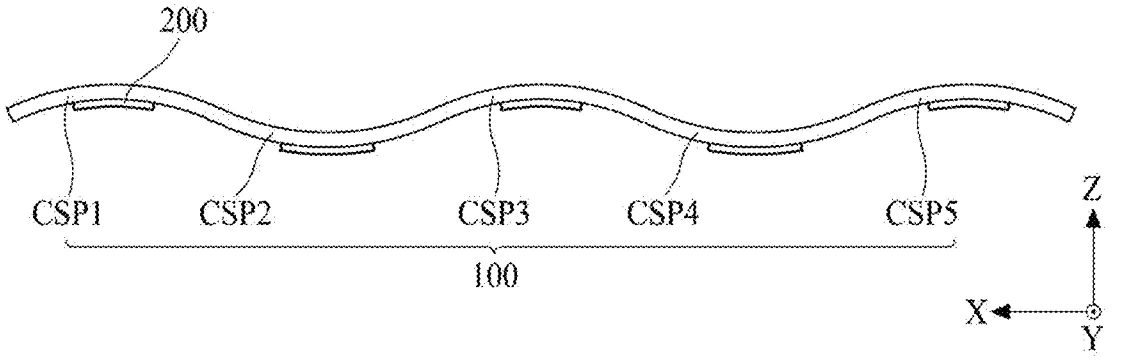
FIGS. 14A to 14C illustrate a display apparatus according to an embodiment of the present disclosure.
Figure 14B:
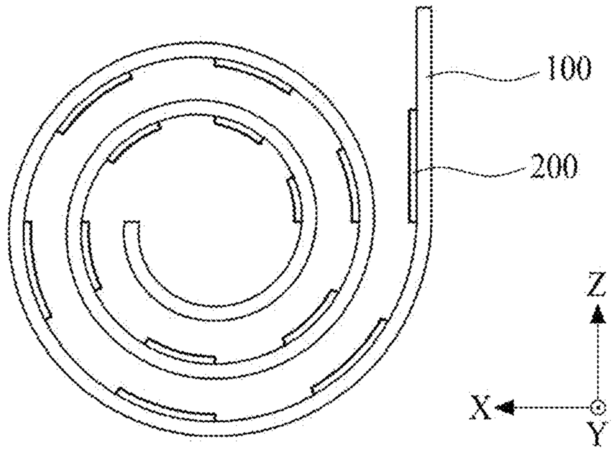
Figure 14C:
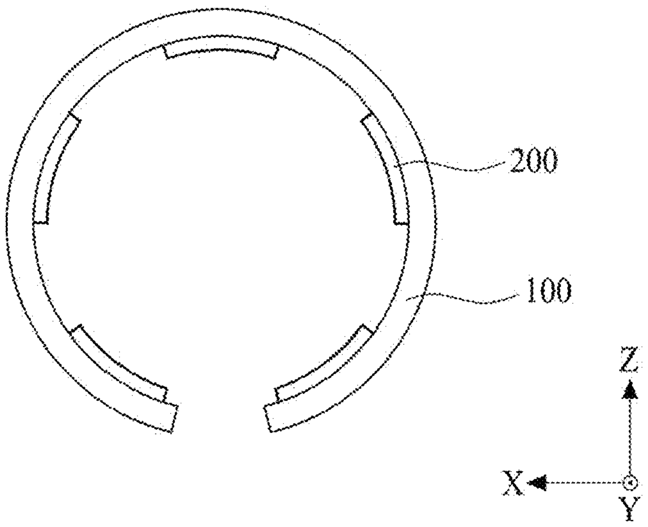

FIGS. 14A to 14C illustrate a display apparatus according to an embodiment of the present disclosure.

With reference to FIG. 14A, the vibration generating device 200 according to embodiments of the present disclosure may be applied to a flexible display apparatus or a commercial display apparatus including the display panel 100 including a plurality of curved surface portions CSP1 to CSP5 which may be concave or convex. For example, the vibration generating device 200 may be implemented to be bent in a shape having a curvature value (e.g., a curvature radius) corresponding to a convex portion or a concave portion of each of the curved surface portions CSP1 to CSP5 of the display panel 100, and may be at the convex portion or the concave portion of each of the curved surface portions CSP1 to CSP5 of the display panel 100. As another example, the vibration generating device 200 may be implemented in a shape corresponding to a curvature value (e.g., a curvature radius) of each of the curved surface portions CSP1 to CSP5 of the display panel 100, and may be on a whole (or entire) rear surface of the display panel 100.

With reference to FIG. 14B, the vibration generating device 200 according to embodiments of the present disclosure may be applied to a rollable display apparatus including the display panel 100 which is spirally wound or unwound. For example, the vibration generating device 200 may be implemented in a shape having a curvature value (e.g., a curvature radius) of the display panel 100 that may be spirally wound or unwound, and a plurality of vibration generating devices 200 may be arranged at certain intervals on the rear surface of the display panel 100. As another example, the vibration generating device 200 may be implemented in a shape corresponding to a curvature value (e.g., a curvature radius) of the display panel 100 that may be spirally wound or unwound and may be disposed on the whole rear surface of the display panel 100.

With reference to FIG. 14C, the vibration generating device 200 according to embodiments of the present disclosure may be applied to a wearable display apparatus including the display panel 100 that may be bent in a "C"-shape, and may be wound around a wrist of a user. For example, the vibration generating device 200 may be implemented in a shape having a curvature value (e.g., a curvature radius) of the display panel 100 which is spirally wound or unwound, and a plurality of vibration generating devices 200 may be arranged at certain intervals on the rear surface of the display panel 100. As another example, the vibration generating device 200 may be implemented in a shape corresponding to a curvature value (e.g., a curvature radius) of the display panel 100 that may be bent in a "C"-shape, and may be disposed on the whole (or entire) rear surface of the display panel 100.

The vibration generating device according to an embodiment of the present disclosure may be applied to display apparatuses. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, apparatuses for cinema, TVs, wallpaper display apparatuses, signage apparatuses, game machines, notebook computers, monitors, cameras, camcorders, home appliances, etc. Also, the vibration generating device according to an embodiment of the present disclosure may be applied to organic light-emitting lighting devices or inorganic light-emitting lighting devices. When the vibration generating device according to the present disclosure is applied to a lighting device, the vibration generating device may act as lighting or a speaker.

A vibration generating device and a display apparatus including the same according to an embodiment of the present disclosure will be described.

A display apparatus according to an embodiment of the present disclosure includes a display panel configured to display an image and a plurality of vibration generating devices on a rear surface of the display panel, the display panel being at least one of a vibration plate configured to output sound and a vibration plate configured to output a haptic vibration, each of the plurality of vibration generating devices includes a first electrode under the display panel, a piezoelectric member under the first electrode, a damping member in a periphery of the piezoelectric member, and a second electrode under the piezoelectric member.

According to some embodiments of the present disclosure, the damping member may surround at least a portion of the piezoelectric member.

According to some embodiments of the present disclosure, the damping member may be between the piezoelectric member.

According to some embodiments of the present disclosure, the first electrode is disposed as one body with respect to the plurality of vibration generating devices.

According to some embodiments of the present disclosure, the second electrode may be independently disposed to correspond to each of the plurality of vibration generating devices.

According to some embodiments of the present disclosure, the piezoelectric member may include a protrusion portion including a curved surface portion on a surface of the piezoelectric member, and the protrusion portion is provided to face the first electrode.

According to some embodiments of the present disclosure, an angle between the first electrode and a virtual normal line with respect to an intersection point between the protrusion portion and a side surface of the piezoelectric member may be within a range from 40 degrees to 60 degrees.

According to some embodiments of the present disclosure, wherein the plurality of vibration generating devices may be formed as a film shape.

According to some embodiments of the present disclosure, the piezoelectric member may include a piezoelectric material, a binder binding the piezoelectric material, and a surface treatment agent dispersing the plurality of piezoelectric material.

According to some embodiments of the present disclosure, the piezoelectric material may be a piezoelectric material having a perovskite structure.

According to some embodiments of the present disclosure, the binder may include a dielectric elastomer.

According to some embodiments of the present disclosure, the damping member may have an elastic modulus that is lower than an elastic modulus of the piezoelectric member.

According to some embodiments of the present disclosure, the damping member may include a piezoelectric material dispersed in the damping member.

According to some embodiments of the present disclosure, the piezoelectric material may include a piezoelectric fiber.

According to some embodiments of the present disclosure, the display apparatus may further include a third electrode corresponding to a lower surface of the damping member.

According to some embodiments of the present disclosure, the third electrode may be disposed apart from the second electrode by a predetermined interval.

According to some embodiments of the present disclosure, the third electrode may be configured to drive the damping member.

According to some embodiments of the present disclosure, the plurality of vibration generating devices may include a plurality of sound generating devices configured to output sound having different frequency ranges.

According to some embodiments of the present disclosure, the plurality of vibration generating devices may include a plurality of haptic devices, and each of the plurality of haptic devices may be configured to operate independently from a haptic vibration of another adjacent haptic device.

A vibration generating device according to an embodiment of the present disclosure includes a piezoelectric member under a first electrode, a damping member configured to surround at least a portion of the piezoelectric member, and a second electrode under the piezoelectric member.

According to some embodiments of the present disclosure, the damping member may include an elastomer.

According to some embodiments of the present disclosure, the damping member may have an elastic modulus that is lower than an elastic modulus of the piezoelectric member.

According to some embodiments of the present disclosure, the damping member may include an elastomer and a piezoelectric ceramic fiber.

A display apparatus according to an embodiment of the present disclosure includes a display panel configured to display an image and a plurality of vibration generating devices on a rear surface of the display panel, the plurality of vibration generating devices configured to vibrate the display panel to generate a vibration, wherein each of the plurality of vibration generating devices includes a first electrode under the display panel, a plurality of piezoelectric members under the first electrode, the plurality of piezoelectric members having different vibration characteristics, and a second electrode under the plurality of piezoelectric members.

According to some embodiments of the present disclosure, the second electrode may be provided in plurality, the second electrode corresponding to correspond to the plurality of piezoelectric members.

According to some embodiments of the present disclosure, the display apparatus may further include a damping member between the plurality of piezoelectric members.

According to some embodiments of the present disclosure, the display apparatus may further include a damping member between the plurality of piezoelectric members, the damping member including a piezoelectric material.

According to some embodiments of the present disclosure, the display apparatus may further include a third electrode corresponding to the damping member.

According to some embodiments of the present disclosure, the third electrode may be disposed apart from the second electrode by a predetermined interval.

According to some embodiments of the present disclosure, the third electrode may be configured to drive the damping member.

According to some embodiments of the present disclosure, each of the plurality of vibration generating devices may include a plurality of sound generating devices configured to output sound of a low-pitched sound band, a middle-pitched sound, and a high-pitched sound band.

According to some embodiments of the present disclosure, each of the plurality of vibration generating devices may include a plurality of haptic devices, and each of the plurality of haptic devices may be configured to operate independently from a haptic vibration of another adjacent haptic device.

The present disclosure may provide a vibration generating device which realizes stereo sound of the low-pitched sound band, the middle-pitched sound band, and the high-pitched sound band and performs a haptic output based on a position of the display panel.

The present disclosure may provide a display apparatus which, by using a vibration generating device, enhances a sound output characteristic, realizes stereo sound of the low-pitched sound band, the middle-pitched sound band, and the high-pitched sound band, and performs a haptic output based on a position of the display panel.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations may be made in the vibration generating device and the display apparatus including the same of the present disclosure without departing from the technical idea or scope of the disclosure. Thus, it may be intended that the present disclosure cover the modifications and variations of the disclosure provided they come within the scope of the appended claims and their equivalents.

What is claimed is:

1. A vibration generating apparatus, comprising:

a plurality of piezoelectric members;

a damping member configured between the plurality of piezoelectric members, a first electrode on a first surface of the plurality of piezoelectric members; and a plurality of second electrodes on a second surface of the plurality of piezoelectric members, wherein each of the plurality of piezoelectric members comprises a protrusion portion including a curved surface portion on the first surface of the plurality piezoelectric members, wherein a portion of an upper surface of the protrusion portion contacts the first electrode, and wherein the damping member includes a portion between the first electrode and the protrusion portion of each of the plurality of piezoelectric members.

2. The vibration generating apparatus of claim 1, wherein a portion other than the portion of the upper surface is not in contact with the first electrode.

3. The vibration generating apparatus of claim 2, wherein the protrusion portion is configured to face the first electrode.

4. The vibration generating apparatus of claim 3, wherein an angle between the first electrode and a virtual normal line with respect to an intersection point between the protrusion portion and a side surface of the piezoelectric member is within a range from 40 degrees to 60 degrees.

5. The vibration generating apparatus of claim 1, wherein the first electrode contacts the first surface of the damping member.

6. The vibration generating apparatus of claim 1, wherein the damping member further comprises an elastomer, and wherein the damping member has an elastic modulus that is lower than an elastic modulus of the piezoelectric member.

7. The vibration generating apparatus of claim 1, further comprising a third electrode on a second surface of the damping member.

8. The vibration generating apparatus of claim 7, wherein the third electrode surrounds at least one of the plurality of second electrodes.

9. The vibration generating apparatus of claim 1, further comprising a third electrode configured to vibrate the damping member.

10. A display apparatus, comprising:

a display panel configured to display an image; and a vibration generating apparatus at a rear surface of the display panel, the vibration generating apparatus being configured to vibrate the display panel, wherein the vibration generating apparatus comprises:

a plurality of piezoelectric members;

a damping member configured between the plurality of piezoelectric members, a first electrode on a first surface of the plurality of piezoelectric members; and a plurality of second electrodes on a second surface of the plurality of piezoelectric members, wherein each of the plurality of piezoelectric members comprises a protrusion portion including a curved surface portion on the first surface of the plurality piezoelectric members, wherein a portion of an upper surface of the protrusion portion contacts the first electrode, and wherein the damping member includes a portion between the first electrode and the protrusion portion of each of the plurality of piezoelectric members.

11. The display apparatus of claim 10, wherein a portion other than the portion of the upper surface is not in contact with the first electrode.

12. The display apparatus of claim 11, wherein the protrusion portion is configured to face the first electrode.

13. The display apparatus of claim 12, wherein an angle between the first electrode and a virtual normal line with respect to an intersection point between the protrusion portion and a side surface of the piezoelectric member is within a range from 40 degrees to 60 degrees.

14. The display apparatus of claim 10, wherein each of the plurality of piezoelectric members includes a piezoelectric material, a binder, and a surface treatment agent.

15. The display apparatus of claim 10, wherein the damping member comprises an elastomer, and wherein the damping member has an elastic modulus that is lower than an elastic modulus of the piezoelectric member.

16. The display apparatus of claim 10, wherein the damping member comprises an elastomer and a piezoelectric ceramic fiber.

17. The display apparatus of claim 10, wherein the vibration generating apparatus further comprises a third electrode on a second surface of the damping member.

18. The display apparatus of claim 17, wherein the third electrode surrounds at least one of the plurality of second electrodes.

19. The display apparatus of claim 10, wherein the vibration generating apparatus further comprises a third electrode configured to vibrate the damping member.

20. The display apparatus of claim 10, wherein each of the plurality of piezoelectric members is configured to output a sound or a haptic vibration having different frequency ranges.

21. A vibration generating apparatus, comprising:

a plurality of piezoelectric members;

a damping member configured between the plurality of piezoelectric members, a first electrode on a first surface of the plurality of piezoelectric members; and a plurality of second electrodes on a second surface of the plurality of piezoelectric members, wherein each of the plurality of piezoelectric members comprises a protrusion portion including a curved surface portion on the first surface of the plurality piezoelectric members, wherein a portion of an upper surface of the protrusion portion contacts the first electrode, and wherein the damping member has an elastic modulus that is lower than an elastic modulus of the piezoelectric member.

22. The vibration generating apparatus of claim 21, wherein the damping member further comprises an elastomer.

* * * * *